US009602783B2

(12) United States Patent
Sugishita et al.

(10) Patent No.: US 9,602,783 B2
(45) Date of Patent: Mar. 21, 2017

(54) IMAGE RECOGNITION METHOD AND CAMERA SYSTEM

(71) Applicant: Panasonic Intellectual Property Management Co., Ltd., Osaka (JP)

(72) Inventors: Yoshihiro Sugishita, Tokyo (JP); Ryohei Wakai, Osaka (JP); Akihiro Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 44 days.

(21) Appl. No.: 14/730,154

(22) Filed: Jun. 3, 2015

(65) Prior Publication Data
US 2015/0363670 A1 Dec. 17, 2015

(30) Foreign Application Priority Data

Jun. 12, 2014 (JP) ................................. 2014-121411
Feb. 13, 2015 (JP) ................................. 2015-026249

(51) Int. Cl.
*G06K 9/00* (2006.01)
*H04N 7/18* (2006.01)
(Continued)

(52) U.S. Cl.
CPC ......... *H04N 7/181* (2013.01); *G06K 9/00771* (2013.01); *G06K 9/00993* (2013.01);
(Continued)

(58) Field of Classification Search
USPC ........ 382/100, 103, 106–107, 118, 154–155, 382/162, 168, 173, 181, 189–194, 199,
(Continued)

(56) References Cited

U.S. PATENT DOCUMENTS

2009/0096897 A1* 4/2009 Saito ...................... H04N 5/232
348/241
2010/0202681 A1* 8/2010 Ai ........................ G06K 9/6257
382/159

(Continued)

FOREIGN PATENT DOCUMENTS

| JP | 2003-316746 | 11/2003 |
|----|-------------|---------|
| JP | 2010-529529 | 8/2010 |
| JP | 2013-003751 | 1/2013 |

*Primary Examiner* — Seyed Azarian
(74) *Attorney, Agent, or Firm* — Greenblum & Bernstein, P.L.C.

(57) ABSTRACT

A first image taken by a first camera device in the plurality of camera devices and first imaging environment information indicating a first imaging environment of the first camera device at a time of taking the first image is acquired. By using a parameter table that manages imaging environment information indicating an imaging environment at a time of taking an image previously by a camera device and a recognition control parameter indicating a detector corresponding to an imaging environment, a first recognition control parameter indicating a first detector corresponding to third imaging environment that is identical or similar to the first imaging environment indicated by the first imaging environment information acquired from the first camera device is selected from the recognition control parameters. The first image acquired from the first camera device is recognized by using the first detector indicated by the selected first recognition control parameter.

11 Claims, 25 Drawing Sheets

(51) Int. Cl.
*G06K 9/62* (2006.01)
*H04N 5/217* (2011.01)

(52) U.S. Cl.
CPC ......... *G06K 9/6257* (2013.01); *G06K 9/6286* (2013.01); *H04N 7/188* (2013.01)

(58) Field of Classification Search
USPC ....... 382/209, 219, 232, 254, 274–276, 291, 382/305, 312, 159; 348/46, 77, 241; 455/450
See application file for complete search history.

(56) References Cited

U.S. PATENT DOCUMENTS

| | | | | |
|---|---|---|---|---|
| 2010/0289878 | A1* | 11/2010 | Sato | H04N 13/0239 348/46 |
| 2011/0034176 | A1* | 2/2011 | Lord | G06F 17/30244 455/450 |
| 2013/0010095 | A1* | 1/2013 | Aoki | G06K 9/00268 348/77 |
| 2013/0308825 | A1* | 11/2013 | Yamazaki | G06K 9/00771 382/103 |

* cited by examiner

FIG. 4

| CLASSIFICATION ID | IMAGING ENVIRONMENT PARAMETER (ILLUMINATION ORIENTATION, FACE SIZE, FACE ORIENTATION) | RECOGNITION CONTROL PARAMETER | LEARNING STATE | CAMERA ID | ASSESSMENT INFORMATION |
|---|---|---|---|---|---|
| GROUP1 | ((15, 20) → (128, 320), 40, 15) | DETECTOR FUNCTION A INCLUDING STRONG CLASSIFIER (Fa(x)) | COMPLETION | — | RECOGNIZE 150 CASES 100 msec |
| GROUP1 | ((15, 20) → (128, 320), 40, 12) | DETECTOR FUNCTION B INCLUDING STRONG CLASSIFIER (Fb(x)) | COMPLETION | — | RECOGNIZE 100 CASES 120 msec |
| GROUP2 | ((128, 20) → (128, 60), 30, 40) | DETECTOR FUNCTION C' INCLUDING STRONG CLASSIFIER (Fc'(x)) | DURING LEARNING | 10000003 | — |
| GROUP3 | ((15, 20) → (128, 320), 50, 39) | DETECTOR FUNCTION D' INCLUDING STRONG CLASSIFIER (Fd'(x)) | DURING LEARNING | 10000011 10000005 | — |
| GROUP4 | ((0, 130) → (20, 400), 20, 19) | DETECTOR FUNCTION E INCLUDING STRONG CLASSIFIER (Fe(x)) | COMPLETION | 100000010 | RECOGNIZE 20 CASES 80 msec |
| GROUP4 | ((80, 112) → (30, 180), 120, 60) | DETECTOR FUNCTION F INCLUDING STRONG CLASSIFIER (Ff(x)) | COMPLETION | 10030010 | RECOGNIZE 180 CASES 130 msec |
| GROUP5 | ((180, 120) → (40, 50), 35, 20) | DETECTOR FUNCTION G INCLUDING STRONG CLASSIFIER (Fg(x)) | COMPLETION | 1018820 | RECOGNIZE 150 CASES 160 msec |

((15, 20) → (128, 320), 40, 15)

((15, 20) → (128, 320), 30, 40)

((128, 20) → (128, 96), 60, 12)

IMAGE RECOGNITION METHOD AND CAMERA SYSTEM

BACKGROUND

1. Technical Field

The present disclosure relates to an image recognition technical field.

2. Description of the Related Art

In image recognition, a target image to be recognized is analyzed by extracting a pattern that characterizes an object in the image and by determining whether or not the extracted pattern is classified into a group that is same as a collection group of samples acquired by learning in advance. Examples of the techniques of recognizing an object captured by a camera device include a face detection technique, a face identification technique, and a number plate identification technique, all of which utilize machine learning.

According to the face detection technique and the face identification technique, a detector is applied to an image taken by the camera device and it is determined whether or not a face is included in the image. In use of the detector, before using the detector, the detector is generally trained through machine learning.

SUMMARY

However, Japanese Patent No. 5197737, Japanese Unexamined Patent Application Publication No. 2013-3751, and Japanese Patent No. 4157322 still have room for further improvement.

In one general aspect, the techniques disclosed here feature a method for recognize an image using a camera system including a plurality of camera devices, the method including:

acquiring, from a first camera device in the plurality of camera devices, a first image and first imaging environment information, wherein the first image is taken by the first camera device, and first imaging environment information indicates a first imaging environment of the first camera device at a time of taking the first image;

by using a parameter table that manages i) imaging environment information indicating each imaging environment at each time of taking each image previously by each camera device in the plurality of camera devices and ii) each recognition control parameter indicating each detector corresponding to each imaging environment, determining a first recognition control parameter based on the each recognition control parameter, wherein the first recognition control parameter indicates a first detector corresponding to a third imaging environment, the third imaging environment having an identical degree or similarity degrees that exceed a predetermined threshold with respect to the first imaging environment indicated by the acquired first imaging environment information; and recognizing the first image acquired from the first camera device, using the first detector indicated by the determined first recognition control parameter.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates an example of a parameter table held in a parameter table storage section;

DETAILED DESCRIPTION

Introduction of Embodiment

Figure 1:
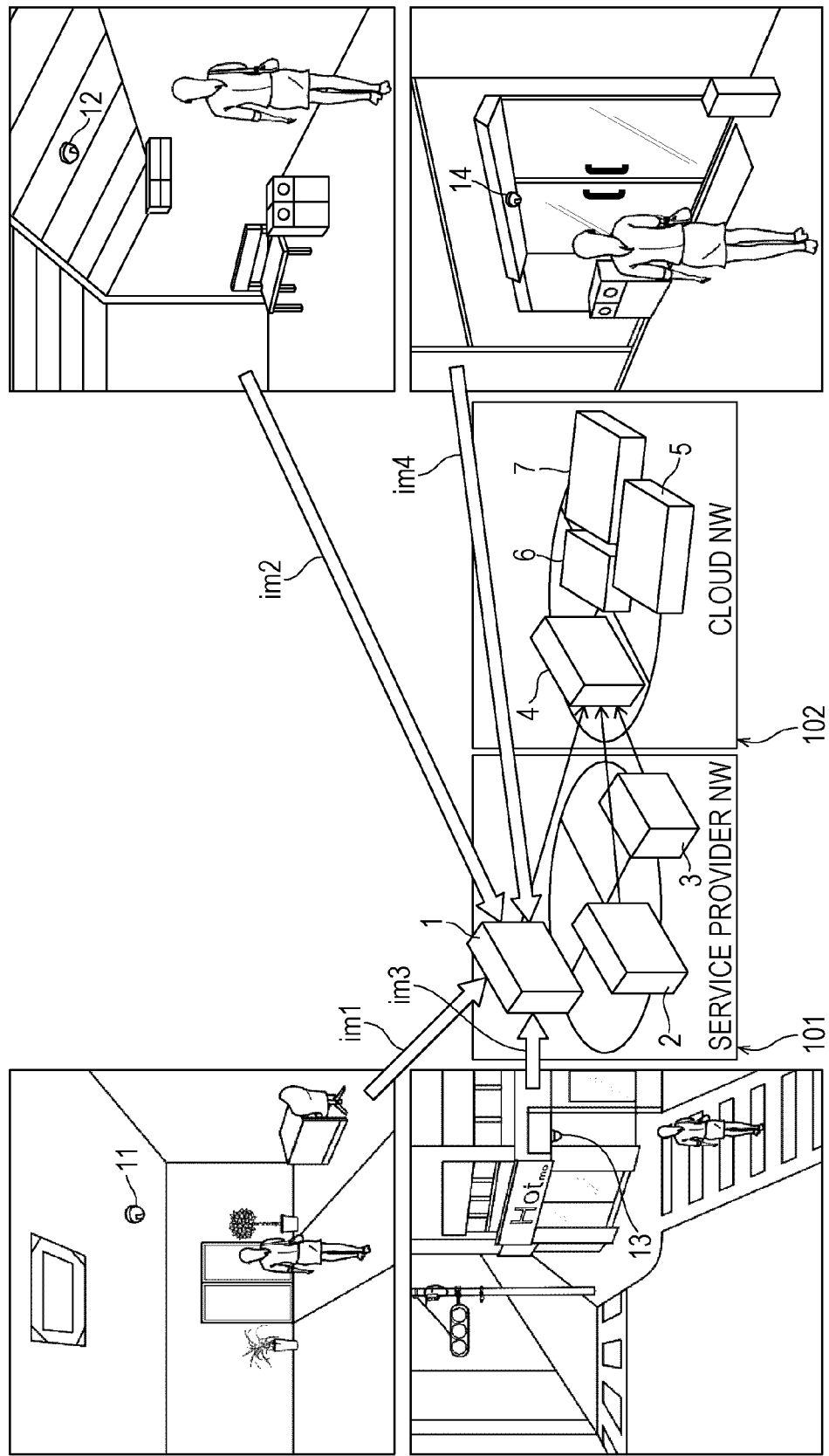
FIG. 1 is a view illustrating configuration of a camera system.

In implementing a camera system having a pattern recognition function using image recognition, inventors made following consideration. Inputting training data to a detector for learning is publicly known. In such face learning, when general environmental conditions are assumed, and a sample collection of a face model and a non-face model under the general environmental conditions is defined as training data, the detector acquired by learning satisfies a sufficient performance under the general environmental conditions. However, when the assumed environmental conditions or the sample collection largely differ from the actual imaging environment, the detector may not satisfy a desired performance due to changes of the environment and target. For example, a large change of ray emission greatly modifies the face model to greatly deviate from the face model under the general environmental condition. As a matter of course, unless the camera device is installed so as to take a target model that is similar to the sample collection defined as the training data, the desired performance cannot be achieved.

There are two methods of reducing the effect of such difference between the actual image taken by the camera device and the assumed general environmental conditions or the sample collection, improving robustness.

The first method is to optimize the installation environment of the camera device to reproduce environment conditions that are equal to the general environmental conditions assumed by learning. This method is typical in installing the dedicated camera device and identifying a specific pattern.

The second method is to perform additional machine learning and optimize a recognition control parameter including a detector or a feature amount of the face according to actual environmental conditions rather than the assumed general environmental conditions. According to this method, by performing additional learning while keeping robustness to changes, the recognition control parameter specific to a particular target or imaging conditions can be generated to improve an identification performance. For example, Japanese Patent No. 5197737 proposes a method of compensating a shortage of the sample collection under the installation environmental conditions in the camera device by additional learning to improve robustness of the detector.

A camera device capable of dynamically adding an application via a network has been recently on the market. However, when an application that remotely recognizes a particular pattern is added with this mechanism, the camera device installation environment cannot be often checked and altered on the site. Thus, according to the first method, it is difficult to manually correct the difference between the assumed general environmental conditions and the actual imaging environment.

Further, it is difficult to optimally install each of a lot of camera devices in a large-scale camera system according to the general environmental conditions. From these matters, the second method would be more promising than the first method.

However, with the conventional configuration using such additional learning, because the imaging environment varies with time, additional learning must be performed at all times. For this reason, some ways of additional learning may require excessive loads, disadvantageously taking much time for learning.

Especially when additional learning is performed using a plurality of camera devices, additional learning is conducted for each camera device, requiring the same number of learning devices as the numbers of the camera devices. Thus, introducing additional learning into the camera system leads to upsizing of the entire camera system. In addition, when using the plurality of camera devices, training data for additional learning varies from device to device, possibly generating different learning even in the same imaging environment.

Japanese Unexamined Patent Application Publication No. 2013-3751 describes that a table is created by calculating a recognition control parameter for each environment in each camera device to recognize a particular pattern corresponding to a change of imaging environment. However, with the conventional configuration, because the plurality of camera devices cannot share the recognition control parameters calculated by the camera devices, the recognition control parameter must be calculated for each camera device. Thus, the number of camera devices increases, the number of calculations of the recognition control parameter increases, further making the entire pattern recognition system bigger due to additional learning.

On the contrary, Japanese Patent No. 4157322 proposes that the recognition control parameter is determined based on information from a terminal, and the same recognition control parameter is applied to terminals set in the same group. Thus, it is no need to perform learning in each terminal. Although the number of learning devices can be reduced according to this method, previous recognition control parameters are not managed and thus, the recognition control parameter must be calculated at each reception of information from the terminal.

This disclosure includes various aspects of an image recognition method and a camera system that can solve the above-mentioned problems. The plurality of aspects constitute systems of following 1., 2., 3. . . . technical concepts.

(1. Basic Aspect)

This is a basis for the system of technical concepts. That is, it is a method for recognize an image using a camera system including a plurality of camera devices, the method including:

acquiring, from a first camera device in the plurality of camera devices, a first image and first imaging environment information, wherein the first image is taken by the first camera device, and first imaging environment information indicates a first imaging environment of the first camera device at a time of taking the first image;

by using a parameter table that manages i) imaging environment information indicating each imaging environment at each time of taking each image previously by each camera device in the plurality of camera devices and ii) each recognition control parameter indicating each detector corresponding to each imaging environment, determining a first recognition control parameter based on the each recognition control parameter, wherein the first recognition control parameter indicates a first detector corresponding to a third imaging environment, the third imaging environment having an identical degree or similarity degrees that exceed a predetermined threshold with respect to the first imaging environment indicated by the acquired first imaging environment information; and recognizing the first image acquired from the first camera device, using the first detector indicated by the determined first recognition control parameter.

From this aspect, the recognition control parameter corresponding to the imaging environment in which the camera device is installed can be selected in the parameter table and used, thereby suppressing the effect of the difference between the actual imaging environment and the assumed general environmental conditions to recognize a particular pattern. In this manner, the identification performance can be improved without manually adjusting the installation environment of each camera device and calculating the recognition control parameter through machine learning at all times.

(2. Subordinate Conceptualization of Image Recognition)

Below-mentioned subordinate conceptualization of image recognition is possible. The subordinate conceptualization means that the first image is recognized by applying the first detector to pattern information indicating a feature vector of the first image that is extracted from the first image. Since it is detected whether or not a desired object is present in the first image by applying the first detector to the feature vector extracted from the first image, the accuracy of image recognition can be improved.

(3. Processing at Occurrence of Change of Imaging Environment)

Processing at the occurrence of a change of the imaging environment can be added to the method. The processing at the occurrence of a change of the imaging environment includes:

acquiring, from the first camera device, a second image and second imaging environment information, wherein the second image is taken by the first camera device, and the second imaging environment information indicates a second imaging environment of the first camera device at a time of taking the second image;

when the first imaging environment information is different from the second imaging environment information, by using the parameter table, determining a second recognition control parameter, wherein the second recognition indicates a second detector corresponding to a fourth imaging environment, the fourth imaging environment having an identical degree or similarity degrees that exceed the predetermined threshold with respect to the second imaging environment indicated by the acquired second imaging environment information; and recognizing the second image acquired from the first camera device, using the second detector indicated by the determined second recognition control parameter.

(4. Processing in the Case of Absence of Corresponding Recognition Control Parameter)

Processing in the case of absence of the corresponding recognition control parameter can be added to the method. The processing in the case of absence of the corresponding recognition control parameter includes: when the first recognition control parameter is not present in the parameter table, generating the first recognition control parameter according to a predetermined learning algorithm, and updating the parameter table by using the generated first recognition control parameter.

Because the recognition control parameter is generated only when the corresponding imaging environment information is not present in the parameter table, the generation of the recognition control parameter is limited to a required minimum. The number of times the parameter is generated can be decreased, reducing loads on the system.

(5. Processing in the Case of Absence of Second Recognition Control Parameter)

Processing in the case of absence of corresponding second recognition control parameter can be added to the method. The processing in the case of absence of the second recognition control parameter includes: when the first camera device takes the second image in the second imaging environment that is different from the first imaging environment, acquiring, from the first camera device, the second image and second imaging environment information;

searching the parameter table for the second recognition control parameter; and when the second recognition control parameter is not present in the parameter table, generating the second recognition control parameter according to a predetermined learning algorithm, and updating the parameter table using the generated second recognition control parameter.

Because the recognition control parameter is generated only when the imaging environment information after the change of the imaging environment is not present in the parameter table, the generation of the recognition control parameter is limited to a required minimum. The number of times the parameter is generated can be decreased, reducing loads on the system.

(6. Processing of First Camera Device)

Processing of the camera can be added to the method. The processing includes:

when the first recognition control parameter indicates the first detector corresponding to the third imaging environment that has not an identical degree but the similarity degrees with respect to the first imaging environment, transmitting, to the first camera device, an instruction to change setting of the first camera device to take an image in the third imaging environment;

acquiring a third image taken in the third imaging environment from the first camera device; and recognizing the third image acquired from the first camera device, using the first detector indicated by the first recognition control parameter.

(7. Introduction of Similarity)

Similarity can be introduced to select the recognition control parameter. Selecting the recognition control parameter on the basis of similarity includes:

calculating each similarity degree from each difference between i) the first imaging environment information indicating the first imaging environment and ii) the imaging environment information indicating each imaging environment managed in the parameter table; and when the parameter table includes a plurality of pieces of imaging environment information that indicates the imaging environments having similarity degrees exceeding the predetermined threshold with respect to the first imaging environment, determining, as the first recognition control parameter, one recognition control parameter indicating one detector corresponding to one imaging environment having the highest similarity degree.

(8. Selection of Parameter as a Basis for Generating Recognition Control Parameter)

The recognition control parameter can be generated based on the existing recognition control parameters. Generating the recognition control parameter on the basis of the existing recognition control parameters includes:

calculating each similarity degree from each difference between i) the first imaging environment information indicating the first imaging environment at the time of taking the first image and ii) the imaging environment information indicating each imaging environment managed in the parameter table; and when the parameter table does not includes the imaging environment information that indicates the imaging environments having similarity degrees exceeding the predetermined threshold with respect to the first imaging environment, i) determining a third recognition control parameter, wherein the third recognition control parameter indicates one detector corresponding to one imaging environment having the highest similarity degree from similarity degrees that are smaller than the predetermined threshold, and ii) generating a fourth recognition control parameter used for recognition of a newly acquired image on the basis of the generated third recognition control parameter according to a predetermined learning algorithm.

Because the recognition control parameter having the highest similarity among the existing recognition control parameters in the parameter table is used as a basis for generating a new recognition control parameter, the time required to conclude learning by the learning algorithm can be reduced.

(9. Selection of Feature Vector as a Basis for Generating Recognition Control Parameter)

The feature vector used as a basis for generating the recognition control parameter can be selected. From the aspect of the method capable of performing the selection, when the first recognition control parameter is generated according to the predetermined learning algorithm, i) the first image and ii) a feature vector extracted from a second image are used as a base, wherein the second image is taken by a second camera device that is different from the first camera device, in the same imaging environment as the first imaging environment indicated by the first imaging environment information.

Because the image taken by another camera in the same imaging environment is used as a basis for generating the recognition control parameter, the recognition control parameter suitable for recognizing the image taken by the camera device can be readily acquired.

(10. Classification of Imaging Environment Information)

A plurality of recognition control parameters can be classified and managed in the parameter table. The classification includes:

classifying the imaging environment information indicating each imaging environment on the basis of i) each feature vector of each image previously taken by each camera device in the plurality of the camera devices or ii) information indicating each imaging environment detected at each time of taking each image previously by each camera device in the plurality of the camera devices; and associating each recognition control parameter indicating each detector with the classified imaging environment information, and managing the each recognition control parameter in the parameter table.

(11. Subordinate Conceptualization of Imaging Environment Information)

The imaging environment information can be embodied using specific information on imaging. The embodying means that the information indicating the each detected imaging environment includes any of information on surrounding illuminance of each image previously taken by each camera device, information on each illumination orientation of each camera device, information on each distortion due to each lens attached to each camera device, information on each shake of each image due to each shake of each camera device, information on each target object size in each image, and information on each target object orientation in each image. Because details of the state of the camera device can be grasped based on the information elements included in the imaging environment information, selection of the recognition control parameter becomes reliable.

(12. Aspect of Camera System)

The above-mentioned aspect can be achieved with one camera system including constituents that are similar to those in the method. A camera system including a plurality of camera devices includes: an acquisitor that, when a first image is taken by a first camera device in the plurality of camera devices, acquires i) the first image and ii) first imaging environment information indicating first imaging environment of the first camera device at a time of taking the first image from the first camera device;

a determiner that determines a first recognition control parameter indicating a first detector corresponding to a third imaging environment, the third imaging environment having an identical degree or similarity degrees that exceed a predetermined threshold with respect to the first imaging environment indicated by the first imaging environment information, by using a parameter table managing imaging i) environment information indicating each imaging environment at each time of taking each image previously taken by each camera device in the plurality of camera devices, and ii) each recognition control parameter indicating each detector corresponding to the imaging environment information; and a recognitor that recognizes the first image taken by the first camera device by using the first detector indicated by the determined first recognition control parameter.

In the camera system, because even the image taken in the identical or similar imaging environment by a different camera device is recognized using the same recognition control parameter, the identity of the recognized object can be kept at high level. Because such search for the imaging environment requires no additional learning or takes less time for additional learning, time during which image recognition becomes incomplete can be minimized.

The present disclosure is not limited to the particular pattern to be recognized, and can be applied to identification of various particular patterns (personal identification, face detection technique, human detection, car detection, motorcycle detection, moving object detection, character recognition, object recognition, license plate recognition, scene classification, gesture recognition). In below-mentioned embodiments, the face detection technique is described. Numerical values, shape, constituents, arrangement and connecting mode of the constituents, and the order of steps are merely examples, and do not limit the present disclosure at all. Constituents that are not recited in an aspect indicating the most significant concepts in constituents of the following embodiments are described at optional constituents.

Embodiment 1

An embodiment of the present disclosure will be described below with reference to drawings. A camera system in Embodiment 1 will be described. The camera system described herein refers to a computer system that is connected to a camera device and is configured of one or more computers. Examples of the computer system include a cloud computer system in which a cloud server starts a guest OS in a terminal and supplies information using an application started on the guest OS, a client-server system in which a server supplies information according to a request from a client, a computer system in which Peer to Peer connection is made between computers, and a grid computer system in which a computer functions as a grid to execute distribution processing. FIG. 1 illustrates an example of configuration of the camera system in Embodiment 1. The camera system illustrated in FIG. 1 includes a data supply center 101 and a data management center 102, and processes images taken by cameras 11, 12, 13, and 14 installed at an entrance of a building, a platform in a station, and entrances of a convenience store. Im1, im2, im3, and im4 in FIG. 1 represent supply of the images taken by the respective cameras 11, 12, 13, and 14 to the camera system.

The data supply center 101 is a service provider network as a contact for the user, and is configured of an in-company intranetwork and servers (image server 1, reference server 2, application server (APS)3) that provide various functions to computers in the intranetwork. The images taken by the cameras 11, 12, 13, and 14 are stored in the image server. The data management center 102 is configured of a cloud network. The cloud network is a virtual local area network (VLAN) handled integrally with the service provider network in the data supply center by adopting an integrated elastic cloud computing (iEC2) architecture or the like, and includes one or more cloud servers 4, a logic customer edge 5 that function as a request source node (request source in a customer private network) in the cloud network, a switch group 6 for connection between the cloud servers, and a directory server 7 that associates the location of an instance in the cloud server and the location of a switch connected to the cloud server with a set of an IP address and a MAC address of the request source node-request destination, and manages them. A schematic view of FIG. 3 functionally illustrates the system of hardware structure in FIG. 1 from the viewpoint of pattern recognition.

Figure 2:
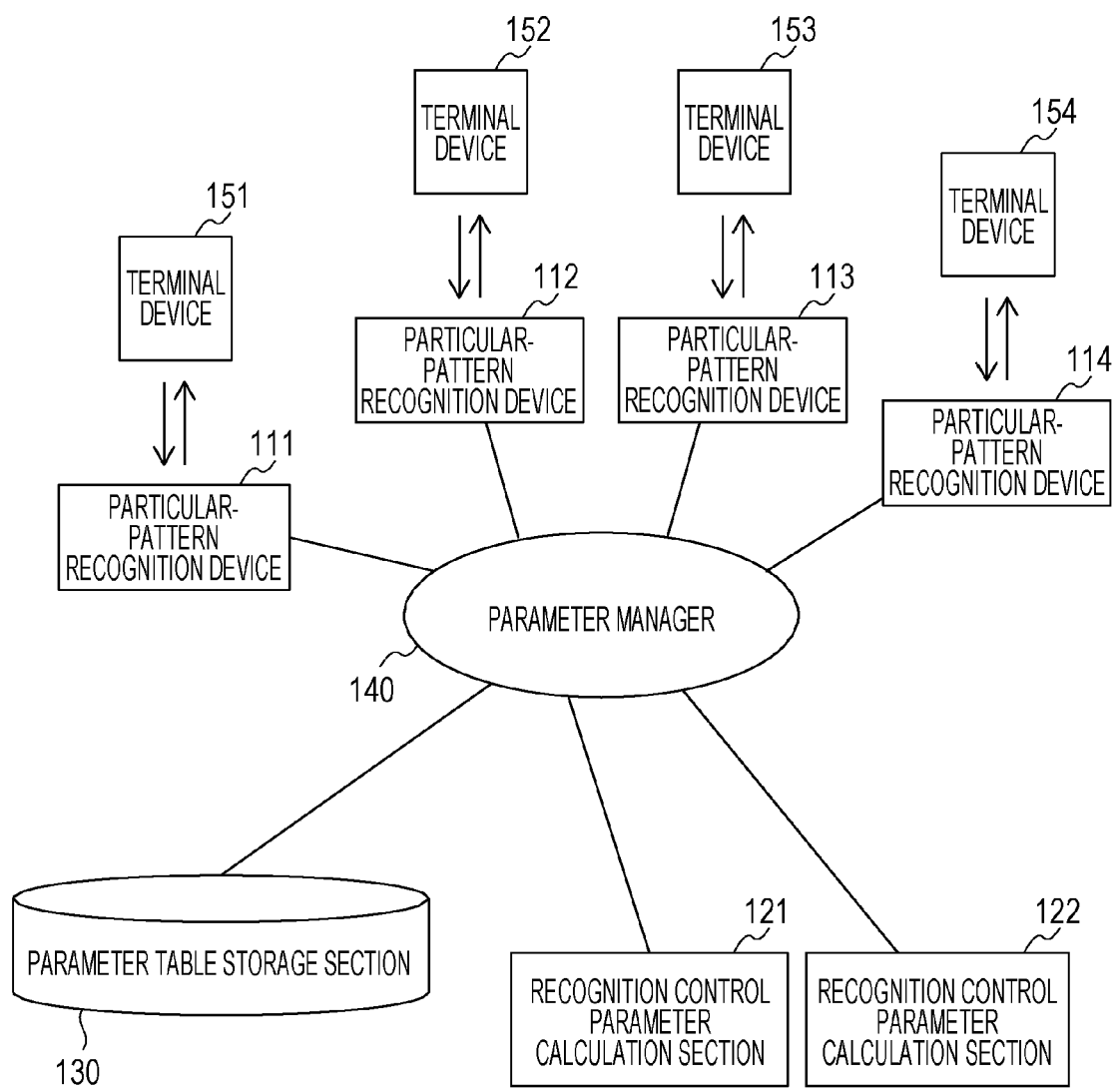
FIG. 2 is a schematic view illustrating whole configuration of a camera system in Embodiment 1.

FIG. 2 is a schematic view illustrating the entire configuration of the camera system in Embodiment 1. In FIG. 2, the camera system includes a plurality of particular-pattern recognition devices 111 to 114, recognition control parameter calculation sections 121 and 122, a parameter table storage section 130, a parameter manager 140, and terminal devices 151, 152, 153, and 154.

The particular-pattern recognition devices 111 to 114 each include two or more imaging sections installed at a plurality of sites, and recognize a particular pattern in a taken image. Although the particular-pattern recognition devices 111 to 114 each include the two or more imaging sections installed at the plurality of sites, for simplification, it is assumed that the particular-pattern recognition devices 111 to 114 each include one imaging section, and one particular-pattern recognition device constitute one camera device. Further, it is assumed that a pattern to be recognized is an image of a face in the taken image.

The recognition control parameter calculation sections 121 and 122 calculate the recognition control parameter. In this embodiment, face detection is used as a specific example of recognition. Thus, the recognition control parameter in this embodiment is a detector in person image. The detector is mainly configured of a strong classifier. Thus, the recognition control parameter in this embodiment widely encompasses the strong classifier itself as the main constituent of the detector, numerical data defining the strong classifier, a link to the strong classifier, and numerical values for transition of sample distribution in a feature space. The recognition control parameter calculation sections 121 and 122 calculate the recognition control parameter when a new detector is calculated at new learning in off-line learning, and when the detector is recalculated at additional learning in on-line learning. When recalculation of the recognition control parameter is unnecessary, the recognition control parameter calculation sections 121 and 122 are omitted. In recalculation, the recognition control parameter calculation section may be one. However, use of the plurality of recognition control parameter calculation sections can recalculate a plurality of recognition control parameters at the same time.

The parameter table storage section 130 associates an imaging environment parameter indicating the imaging environment with the recognition control parameter used for identification, and holds the parameters.

The parameter manager 140 is a constituent that manages the parameter table storage section 130. Managing the parameter table storage section 130 includes acquisition of a recognition/identification parameter, registration of a new recognition control parameter, and deletion of the recognition/identification parameter.

The terminal devices 151, 152, 153, and 154 are smartphones, tablet terminals, or the like, and accept various operations for setting and managing the camera device from a system manager.

Schematic configuration of the camera system has been described above. Subsequently, details of processing of the recognition control parameter calculation sections 121 and 122 will be described.

An initial value in the case where the recognition control parameter calculation sections 121 and 122 perform additional learning will be described. In additional learning, the parameter manager 140 selects the recognition control parameter of the imaging environment having the highest similarity is selected as the initial value of additional learning. When the imaging environment changes during learning, the recognition control parameter during learning is stored in the parameter table storage section 130. Then, when the imaging environment changes again and becomes the same imaging environment parameter as that of the imaging environment during learning, the parameter manager 140 acquires the recognition control parameter during learning, which is stored in the parameter table storage section 130, and sets the acquired recognition control parameter to the initial value of additional learning. Starting additional learning at the midpoint can take less learning time than starting additional learning from the beginning.

Acquisition of the training data will be described. When any of the plurality of particular-pattern recognition devices 111 to 114 having the same imaging environment parameter starts to perform learning, images taken by the plurality of particular-pattern recognition devices 111 to 114 can be supplied as the training data to perform additional learning, increasing the number of samples of learning and finishing learning earlier.

Recalculation of the detector in additional learning will be described. Any known learning method such as On-line AdaBoost is introduced in the recalculation of the detector. Because Japanese Patent No. 5197737 describes recalculation of the recognition control parameter in additional learning in detail, description thereof is omitted. Additional learning requires determining whether or not learning is completed. For example, when a leaning outcome is unchanged for a certain period and seems to be fixed, it can be regarded as the completion of learning. Recalculation of the recognition control parameter calculation sections 121 and 122 has been described above.

There are various correspondences between the computers in data supply center 101 and the data management center 102 in FIG. 1, and functional blocks in FIG. 2. An example of the correspondences is as follows. The particular-pattern recognition devices 111 to 114 correspond to the cameras 11 to 14, respectively, and the recognition control parameter calculation sections 121 and 122, the parameter table storage section 130, and the parameter manager 140 correspond to any of the image server 1, the reference server 2, the APS 3, and the cloud server 4 in the service provider network.

The image server 1, the reference server 2, the APS 3, and the cloud server 4 are typical computers configured of MPU, ROM, RAM, and communication interface, and the image server 1 and the reference server 2 each start an application on their operating systems and perform a predetermined function. According to an instruction from a hypervisor, the cloud server 4 starts an operating system and an application supplied from the APS 3 to perform a predetermined function. Alternatively, the particular-pattern recognition devices 111 to 114 as camera devices each may start an application on its operating system to perform image recognition without transmission of image data to the image server 1 and the cloud server 4. As described above, the face detection technique may be performed by the applications started on the operating system of the image server 1, the reference server 2, and the cloud server 4, or performed by the application started on the operating system of the camera device.

Figure 3:
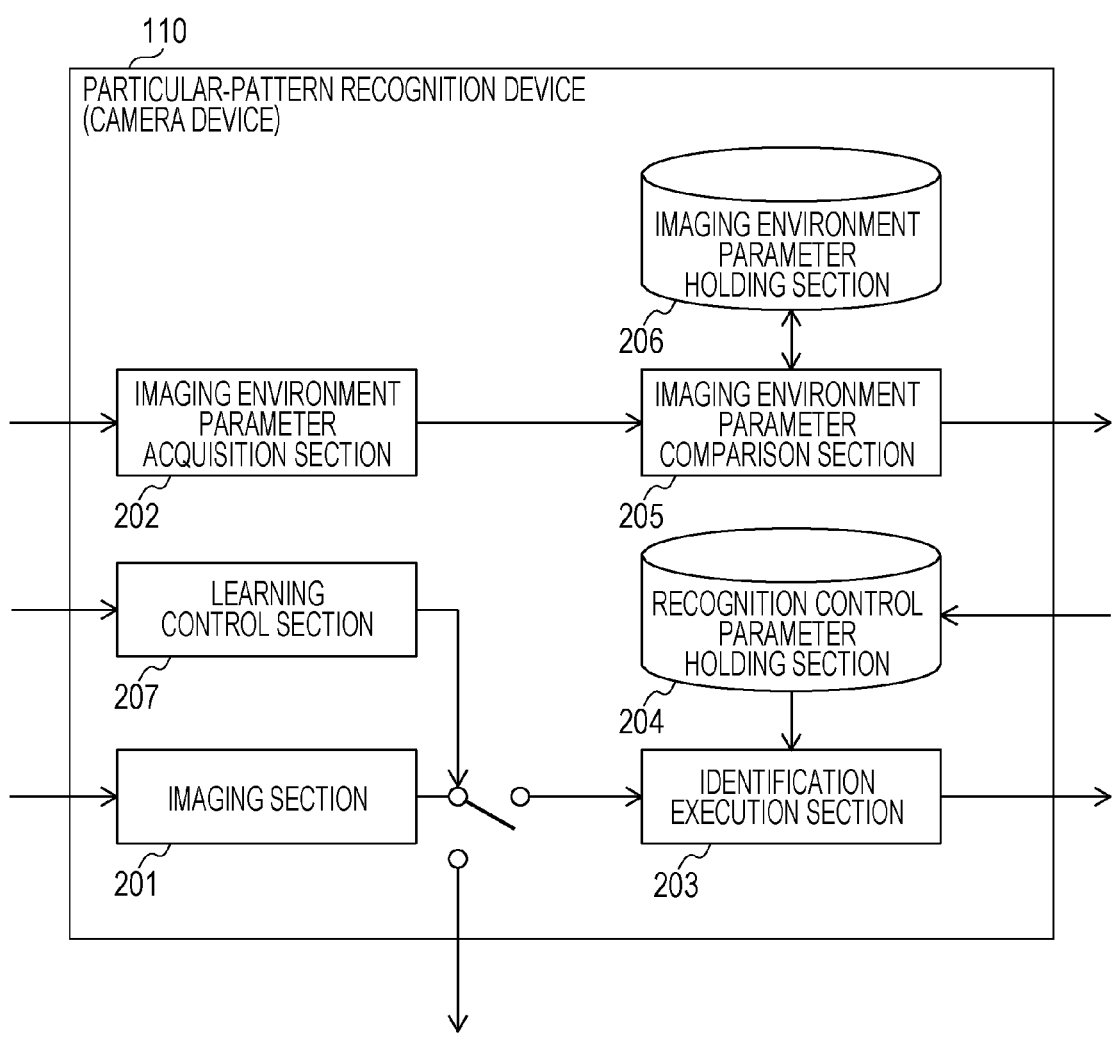
FIG. 3 is a view illustrating internal configuration of a particular-pattern recognition device.

FIG. 3 is a view illustrating internal configuration of the particular-pattern recognition devices 111 to 114. The particular-pattern recognition devices 111 to 114 each are a system for detecting a face from an image acquired from the camera and the like, and include an imaging section 201, an imaging environment parameter acquisition section 202, an identification execution section 203, a recognition control parameter holding section 204, an imaging environment parameter comparison section 205, an imaging environment parameter holding section 206, and a learning control section 207. The imaging section 201 includes a charge coupled device (CCD), a complementary metal oxide semiconductor (CMOS) image sensor, and an optical lens, and periodically takes an image according to predetermined camera setting. Although the image sensor and the optical lens constitute the imaging section in this embodiment, the camera body may constitute the imaging section 201.

The imaging environment parameter acquisition section 202 periodically acquires the imaging environment parameter indicating imaging-related environment by using a sensor attached to the camera of a sensor incorporated in the camera. The identification execution section 203 performs pattern identification according to the image taken by the imaging section 201. The first imaging environment parameter is assumed to be held as a current imaging environment parameter in the imaging environment parameter holding section 206. In this case, by receiving a first image corresponding to a first imaging environment parameter from the imaging section 201, extracting a particular pattern from the first image, and applying the feature vector to the detector indicated by the recognition control parameter held in the recognition control parameter holding section 204, the particular pattern (characterizing a face) is identified in various patterns in the taken image. After that, when a second imaging environment parameter that is different from the first recognition control parameter is inputted, and a second imaging environment parameter is held a new current imaging environment parameter in the imaging environment parameter holding section 206, by receiving a second image corresponding to the second imaging environment parameter from the imaging section 201, extracting a feature vector as the particular pattern from the second image, and applying the feature vector to the detector indicated by the current recognition control parameter held in the recognition control parameter holding section 204, it is determined whether or not a desired target to be recognized is present in the first image.

The recognition control parameter holding section 204 holds the current recognition control parameter. When the current recognition control parameter is the first recognition control parameter, and the second recognition control parameter that is different from the first imaging environment parameter is transmitted from the parameter manager 140, by overwriting the current recognition control parameter held in the recognition control parameter holding section 204 using the second recognition control parameter, the current recognition control parameter is updated. In this embodiment, the face detector is held as the recognition control parameter. If the recognition control parameter is externally acquired each time the particular-pattern recognition devices 111 to 114 perform identification, the recognition control parameter holding section 204 may be omitted.

When the imaging environment parameter acquisition section acquires a new imaging environment parameter, the imaging environment parameter comparison section 205 compares the new imaging environment parameter with the current imaging environment parameter stored in the imaging environment parameter holding section 206 to determine whether or not the imaging environment parameter indicated as the current imaging environment parameter is identical or similar to the imaging environment parameter indicated as the new imaging environment parameter. The current imaging environment parameter is defined as the first imaging environment parameter, and the new imaging environment parameter is defined as the second imaging environment parameter. When the first imaging environment parameter is identical or similar to the second imaging environment parameter, it is determined that the imaging environment remains unchanged to keep the contents held in the imaging environment parameter holding section 206. When the first imaging environment parameter is different from the second imaging environment parameter, it is determined that the imaging environment changes from the first imaging environment to the second imaging environment, and the second imaging environment parameter is held as the current imaging environment parameter in the imaging environment parameter holding section 206. When the current imaging environment parameter is updated, the parameter manager 140 causes the parameter manager 140 to search for the recognition control parameter corresponding to the newly-acquired current imaging environment parameter. The newly-acquired imaging environment parameter can be compared with the current imaging environment parameter by calculating a difference between the two imaging environment parameters. Alternatively, when the Euclidean distance between the two imaging environment parameters exceeds a threshold, it can be determined that the imaging environment changes. The imaging environment parameters can be changed from continuous values to discrete values, and the Euclidean distance between the current imaging environment parameter and the previous imaging environment parameter can be calculated. Alternatively, the change of the imaging environment can be determined by classifying the imaging environment by clustering and determining whether or not the current imaging environment parameter and the previous imaging environment parameter are included in the same class.

The imaging environment parameter holding section 206 holds the imaging environment parameter used by the particular-pattern recognition devices 111 to 114 (current imaging environment parameter) out of the plurality of imaging environment parameters.

The learning control section 207 controls the identification execution section 203 to identify the particular pattern, or the recognition control parameter calculation sections 121 and 122 recalculate the recognition control parameter. The learning control section 207 controls the recognition control parameter calculation sections 121 and 122 to calculate a new recognition control parameter. In performing the face detection technique, the recognition control parameter calculation sections 121 and 122 perform additional learning of the detector by using on-line learning. Adaboost, SVM, and neural network can be used as a learning algorithm for additional learning. In this embodiment, Adaboost is used. When using training data in additional learning, manually-created training data may be supplied, or training data created by running a detection algorithm having a large throughput and high accuracy on a server may be applied. When a learning algorithm requiring no training data is used, using image data is sufficient. When the recognition control parameter is recalculated, the learning control section 207 may be omitted.

Common configuration of the particular-pattern recognition devices 111 to 114 has been described above. Subsequently, details of the parameter table storage section 130 will be described.

FIG. 4 is an example of a parameter table held in the parameter table storage section 130. The record configuration of the parameter table will be described. Records in the parameter table are configured of classification ID, imaging environment parameter, recognition control parameter, learning state, camera ID (ID unique to imaging section 201), and assessment information.

The "classification ID" is an identifier for uniquely identifying a classification group including the identical or similar imaging environment parameters and recognition control parameters associated with the imaging environment parameters.

The "imaging environment parameter" includes various information elements for identifying the imaging environment. The information elements of the imaging environment parameter are object-related information elements and lens-related information elements. The object-related information elements include information on illumination orientation of each camera device, information on target object size in each image, information on target object orientation in each image, and information on surrounding illuminance at imaging by each camera device, and the lens-related information elements includes information on distortion of each lens attached to each camera device and camera shake information. FIG. 4 illustrates examples of illumination orientation, face size, and face orientation in the information elements.

The "recognition control parameter" identifies the detector (Fa(x), Fb(x), Fc'(x), Fd'(x), Fe(x), Ff(x), or Fg(x)) to identify one of the detectors (detectors A, B, C', D', E, F, and G in this figure) corresponding to the imaging environment parameter.

The "assessment information" indicates an assessment value for assessing each of a plurality of recognition control parameters that are associated with the identical or similar imaging environment parameter and classified into one group. The assessment value includes the number of times the detector is used for recognition, the success rate of the recognition, and time required for recognition of the detector. Because the individual recognition control parameters in the classification group are associated with the assessment values, when one camera device takes an image, it is possible to assess which of the plurality of recognition control parameters in the classification group matches the imaging environment of the camera device.

The "learning state" is managed as a completed state or a state during learning. For the state during learning, the recognition control parameter during learning and the image acquired from the imaging section 201 of one of the particular-pattern recognition devices 111 to 114, which is being used for learning, are held. In FIG. 3, the camera ID is held as information, but information to be held is not limited to the camera ID.

The parameter table has been described above.

Subsequently, information elements of the imaging environment parameter will be described. Out of the information elements of the imaging environment parameter, the information elements related to object (information on illumination orientation of each camera device, information on target object size in each image, information on target object orientation in each image, and information on surrounding illuminance at a time of taking an image by each camera device) will be described.

Figure 5C:
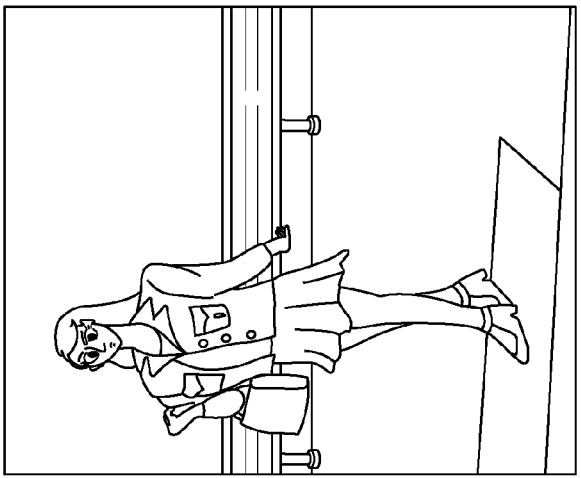
FIG. 5C illustrates an example of an image taken by a camera 13 in the camera system in FIG. 1.
Figure 5B:
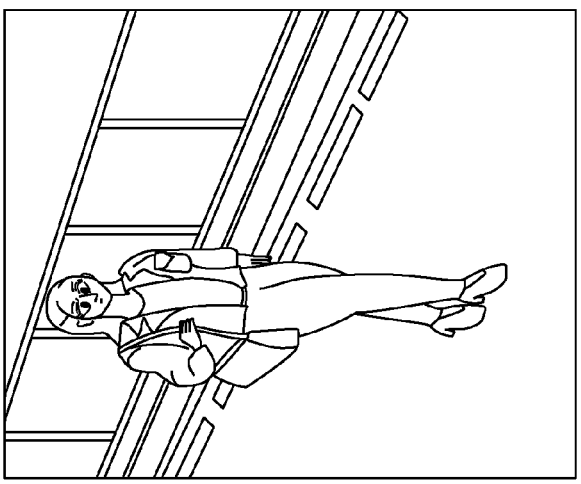
FIG. 5B illustrates an example of an image taken by a camera 12 in the camera system in FIG. 1.
Figure 5A:
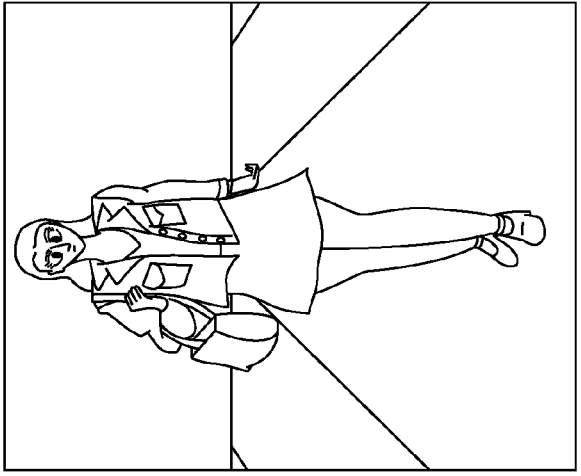
FIG. 5A illustrates an example of an image taken by a camera 11 in the camera system in FIG. 1.

Targets for the illumination orientation, the average face size and average face orientation taken on the imaging section, and surrounding illuminance in the real world will be described.

im1, im2, and im3 in FIG. 5A, FIG. 5B, and FIG. 5C denote images taken by the cameras 11, 12, and 13 in the camera system in FIG. 1. Because the cameras 11, 12, and 13 are installed at the entrance of the building, the platform in the station, and the entrance of the convenience store, the images taken by the cameras vary in the illumination orientation, the face size, and the face orientation. Each entry in the parameter table in FIG. 4 uses the illumination orientation, the face size, and the face orientation in FIG. 5A, FIG. 5B, and FIG. 5C as the imaging environment, and associates the imaging environment with the recognition control parameter, the learning state, and the camera ID.

Figure 6A:
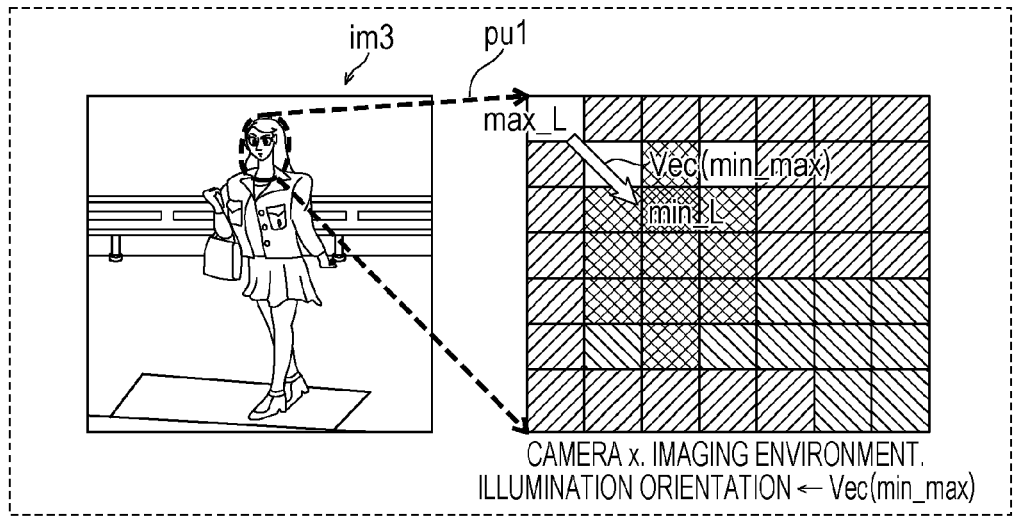
FIG. 6A illustrates an example of a process of acquiring illumination orientation at taking an image by any camera device.
Figure 6B:
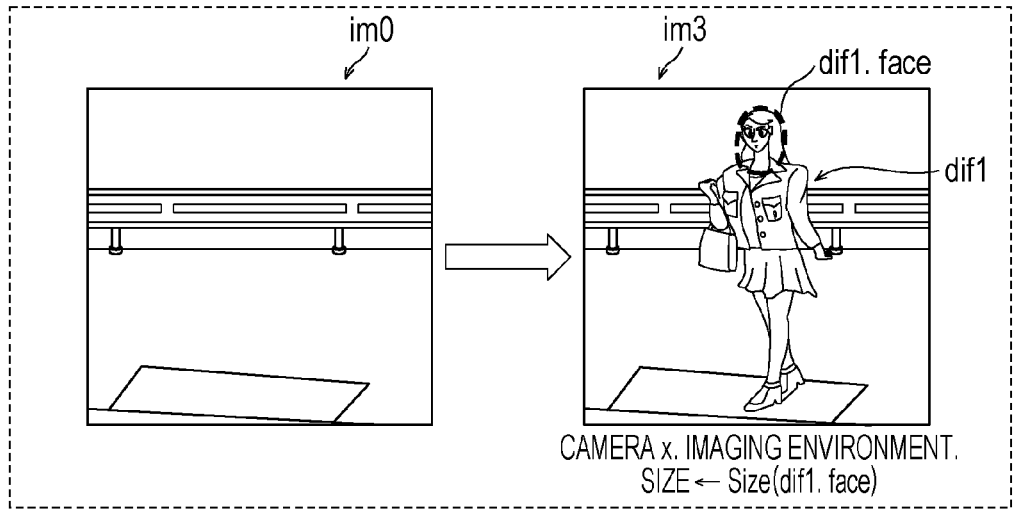
FIG. 6B illustrates an example of a process of acquiring object size at taking an image by any camera device.
Figure 6C:
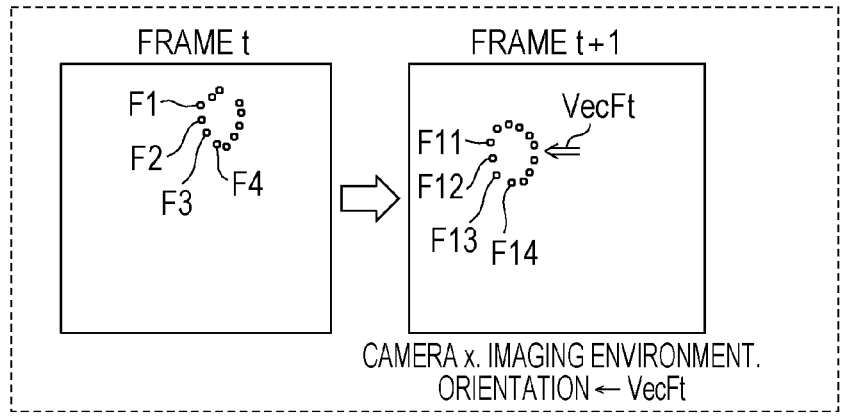
FIG. 6C illustrates an example of a process of acquiring object orientation at taking an image by any camera device.

A way to detect illumination orientation, size, and object orientation that constitute the imaging environment parameter will be described below. FIG. 6A to FIG. 6C illustrate processes of acquiring illumination orientation, object size, and object orientation, respectively, in the case of taking an image by any camera device.

To detect the illumination orientation, for example, the distribution of brightness can be observed by an illuminance sensor. However, in this embodiment, the method of observing the distribution of luminance values of an image taken by the imaging section 201 is described. Specifically, a face is detected from image data acquired from the imaging section 201, and the face image is divided into some blocks to find a luminance average in each block. Then, the direction from the block having the largest luminance average toward the block having the smallest luminance average is defined as the illumination orientation. Because the luminance of the face becomes uniform when light is uniformly emitted, acquiring the illumination orientation by this method is effective.

The acquisition of the imaging environment in im3 in FIG. 5C will be described. im3 in FIG. 5A and FIG. 6A is a taken image including a person image. A leader line pu1 zooms in on a facial part in the taken image im3. A plurality of rectangular frames on the right side of FIG. 6A are pixel blocks acquired by dividing the taken image in the horizontal direction and the vertical direction, and each pixel block is a target for calculating a luminance average value max_L is a pixel block having the largest luminance average value, and min_L is a pixel block having the smallest luminance average value. The max_L serves as a start point of the illumination orientation, and the min_L serves as an end point of the illumination orientation. vec(min_max) in the figure is a vector from max_L to min_L, and coordinates of the start point and coordinates of the end point of the vector correspond to a start point and an end point of the imaging environment parameter.

To detect the object size, an object is irradiated with infrared rays. In this embodiment, an entering object is detected from the image taken by the imaging section 201 according to a background differential method.

FIG. 6B illustrates two images for the background differential method. In FIG. 6B, the left side illustrates a taken image im0 as a reference, and the right side illustrates a taken image im3 including an object. dif1 denotes a difference between the left and right images, which is detected by the background differential method. The size of the facial part (dif1.face) in dif1 is added as the size of the imaging environment parameter.

The object orientation is determined by matching feature points of the image taken by the imaging section 201 with those of another image, and detecting the movement of the feature points. F1, 2, 3, and 4 in FIG. 6C are feature points extracted from the image taken in a frame t. F11, 12, 13, and 14 are feature points extracted from the image taken in a subsequent frame t+1. Because the feature points in the frame t move to the left in the frame t+1, the face of the person is determined to face left. VecFt in the figure represents the direction of the feature points, and the direction corresponds to the face orientation of the person as the object. The VecFt is registered as the "object orientation" in the imaging environment parameter in the parameter table.

The surrounding illuminance is detected based on the luminance of the image taken when the illumination orientation, the target object size, and the target object orientation are acquired, or with an illuminometer of the camera device.

The object-related information elements have been described above. The lens-related information elements in the imaging environment parameter will be described below. The lens-related information elements of the imaging environment parameter are lens distortion information and lens shake information. The lens distortion information includes information on chromatic aberration (axial chromatic aberration, magnification chromatic aberration) and information on monochromatic aberration (spherical aberration, coma aberration, astigmatism, field aberration, distortion).

The axial chromatic aberration is aberration that occurs on a paraxial region of the lens.

The magnification chromatic aberration is aberration that occurs outside the axis due to a variation in the magnification of image formation caused by a change of the focal distance according to color.

The spherical aberration is caused as follows: The lens surface is spherical outside the lens and near the paraxial region of the lens, leading to a shape light refraction angle, such that the focus is achieved near the lens.

The coma aberration is blurring caused by focusing of light entered into the lens on one point on the image surface.

The astigmatism is aberration in which the shape of the actual object is different from that of its image.

The field aberration is aberration in which when an image of a flat face is taken, the image is curved.

The distortion is aberration in which when an image of a rectangular object is taken, the image becomes barrel-shaped or spiral-shaped.

Figure 7A:
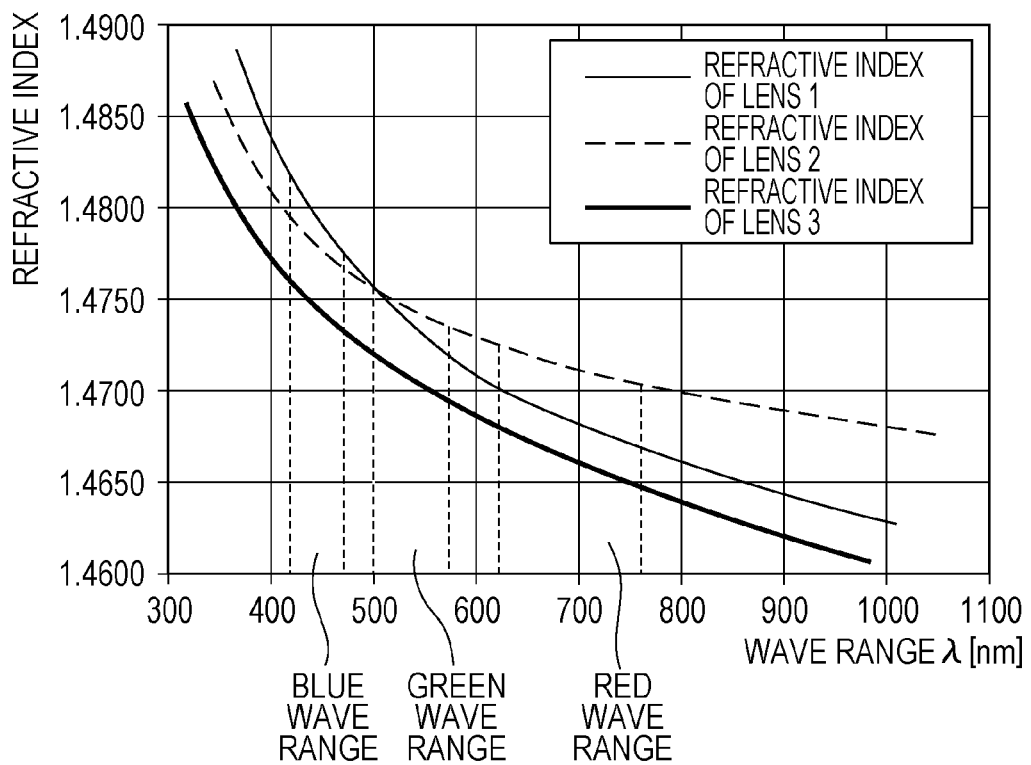
FIG. 7A illustrates an example of a change curve indicating a change of refractive index.

The imaging environment parameter includes, as the aberration-related information elements, refractive index of each of a plurality of wavelengths, change curve indicating a change of refractive index, lens material (silicate glass, plastic resin), and optical structure for correcting aberration (achromatic lens, symmetrical lens, etc.). By including such information elements in the imaging environment parameter, the identity of the aberration-related imaging environment can be determined with high accuracy. FIG. 7A illustrates an example of the change curve indicating a change of the refractive index. The parameter of the change curve, and a correspondence table of the refractive index in the change curve and the wave range may be used as information elements of the imaging environment parameter.

Figure 7B:
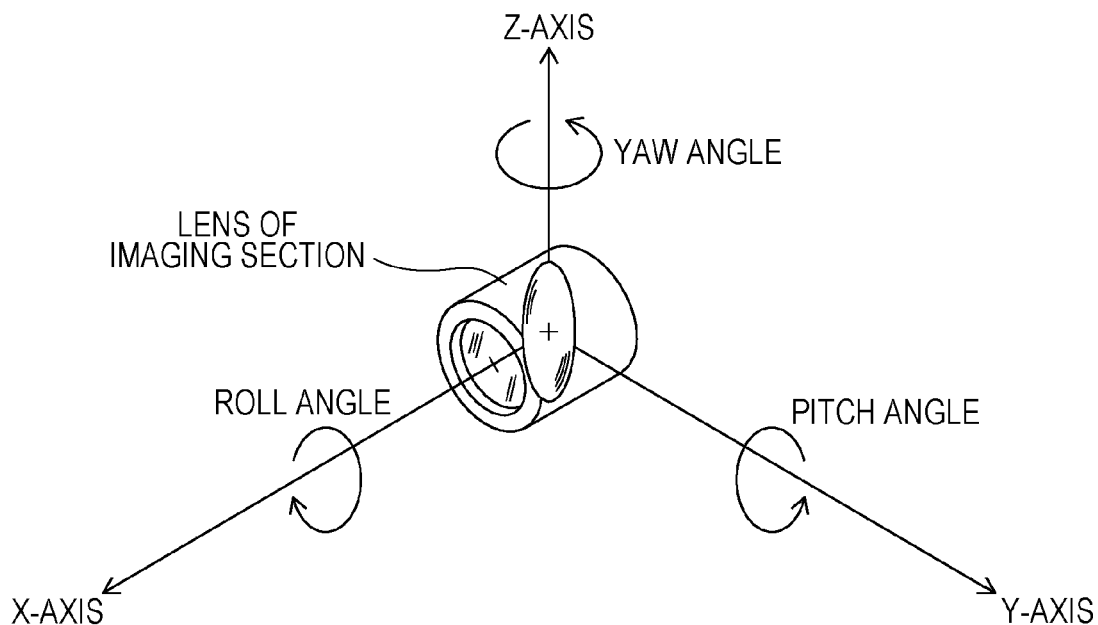
FIG. 7B illustrates a three-dimensional coordinate system for lens shake information.

The lens distortion information will be described. Subsequently, the lens shake information will be described. The lens shake information indicates a lens shake caused by wind or external vibration. FIG. 7B illustrates a three-dimensional coordinate system for the lens shake information. The three-dimensional coordinate system uses the position of the lens as an origin, and shake due to wind and outside vibration can be detected by measuring a roll angle about an X-axis in the three-dimensional coordinate system, a pitch angle about a Y-axis, and a yaw angle about a Z-axis with an acceleration sensor.

By using the object-related information elements and the lens-related information elements as the information elements of the imaging environment parameter, the identity of the imaging environment of multiple camera devices can be determined from both the object side and the optical side. These methods of acquiring the imaging environment parameter are merely examples, and may be any other preferred acquisition method.

The above-mentioned information elements of the imaging environment parameter are not numerical values acquired for each imaging section, but are environmental parameters of the camera image. Thus, the values acquired from the sensor need to be converted into values of the camera image. For example, when the illumination orientation is detected using the sensor or the like, the world coordinate system must be converted into the image coordinate system. The world coordinate system is generally converted into the image coordinate system by perspective transformation. The perspective transformation is a known art and thus, description thereof is omitted. Because the available imaging environment parameter varies depending on the type of the sensor used in the imaging environment parameter acquisition section and the type of algorithm for identification, acquired information elements of the imaging environment parameter are not limited to this.

The information elements of the imaging environment parameter and acquisition thereof have been described above. Subsequently, the detector and the strong classifier for the recognition control parameter will be described.

Figure 8:
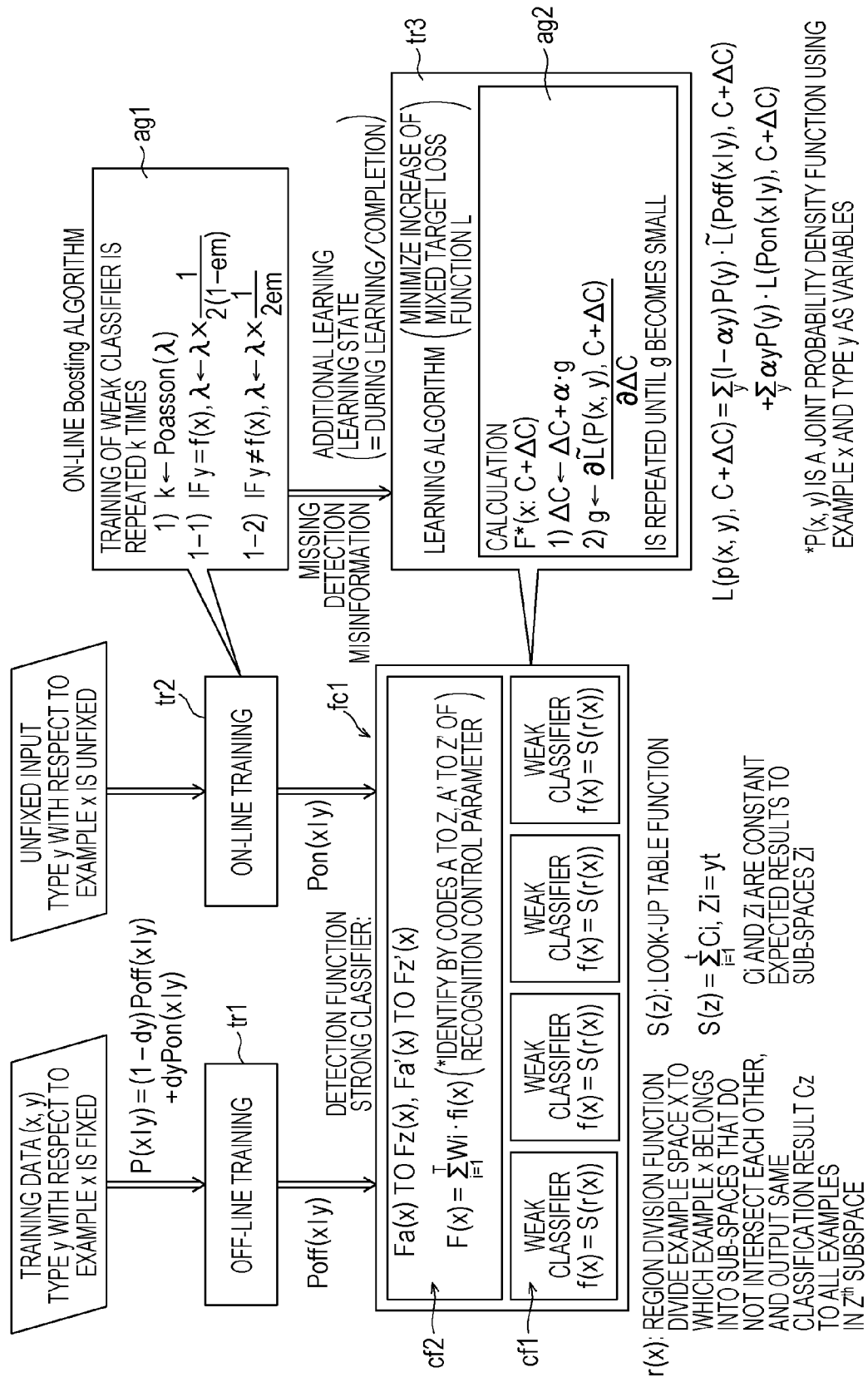
FIG. 8 is a view illustrating internal configuration of detector and a processing process of constituents of the detector.

FIG. 8 is a view illustrating internal configuration of the detector and a processing process of the constituents of the detector. As illustrated in this figure, the detector is configured of a plurality of weak classifiers cf1 and a strong classifiers cf2, and are subjected to off-line training tr1, on-line training tr2, and additional learning tr3.

The weak classifiers cf1 is defined as a numerical formula: $fi(x)=s(r(x))$. $r(x)$ in $fi(x)=s(r(x))$ is a region division function for dividing an example space X to which an example x belongs into sub-spaces $z_i$ that do not intersect each other, and outputting the same classification result Cz to all examples in the plurality of subspaces. S(z) is a look-up function, and a sum of Ci, Zi that are constant expected results to the sub-spaces zi. Ci and Zi are constant expected results to the sub-spaces zi.

The strong classifiers cf2 is expressed as a numerical formula: $F(x) = \Sigma w_i \cdot f_i(x)$.

The relation between the strong classifier F(x) and the weak classifier fi(x) is defined as various numerical formulas (Fa(x) to Fz(x), Fa'(x) to Fz'(x) in the figures). The difference of the strong classifier according to the numerical formula is distinguished by function identification parameters A to Z, A' to Z' in the parameter table.

The off-line training tr1 is a training process performed by inputting a training sample (x, y) in which a type y is established with respect to the example x into the strong classifier. The on-line training tr2 is performed by inputting a training sample (x) in which a type y is not established with respect to the example x into the detector. The on-line training accepts a manual input. The manual input indicates that the result of off-line training or recognition is incorrect. According an on-line Boosting algorithm ag1, a value (Poasson($\lambda$)) found by applying a parameter $\lambda$ to Poasson distribution is set to k, training of the weak classifier is repeated k times, and when a result of the weak classifier after the repetition is y=fi(x), $\lambda$ is updated according to $\lambda \leftarrow \lambda \cdot \frac{1}{2}(1-em)$, and when the result of the weak classifier is y≠fi(x), k is updated after updating of $\lambda$ according to $\lambda \leftarrow \lambda \cdot \frac{1}{2}(em)$, and only updated k is subjected to training of the weak classifier.

In the additional learning tr3, when the output of $F(x) = \Sigma f_i(x)$ as the strong classifier is not correct, a correct output is supplied. The additional learning is achieved by various learning algorithms. An algorithm ag2 in the figure is one of various types of additional learning, which is an increasing learning algorithm that minimizes the gradient of a mixed target loss function. In the increasing learning that minimizes the gradient of the mixed target loss function, processing of updating an adjusted amount $\Delta C$ of a lookup table according to $\Delta C \leftarrow \Delta C + \alpha g$, finding a mixed target loss function $L(p(x, y), c+\Delta c)$ using a joint probability density function p(x, y) of x, y and $\Delta c$ as inputs and defining its partial differential value as g is repeated until g becomes an extreme small value. The learning state according to the learning algorithm in the additional learning is identified using a code indicating that learning is being performed or completed.

Figure 9:
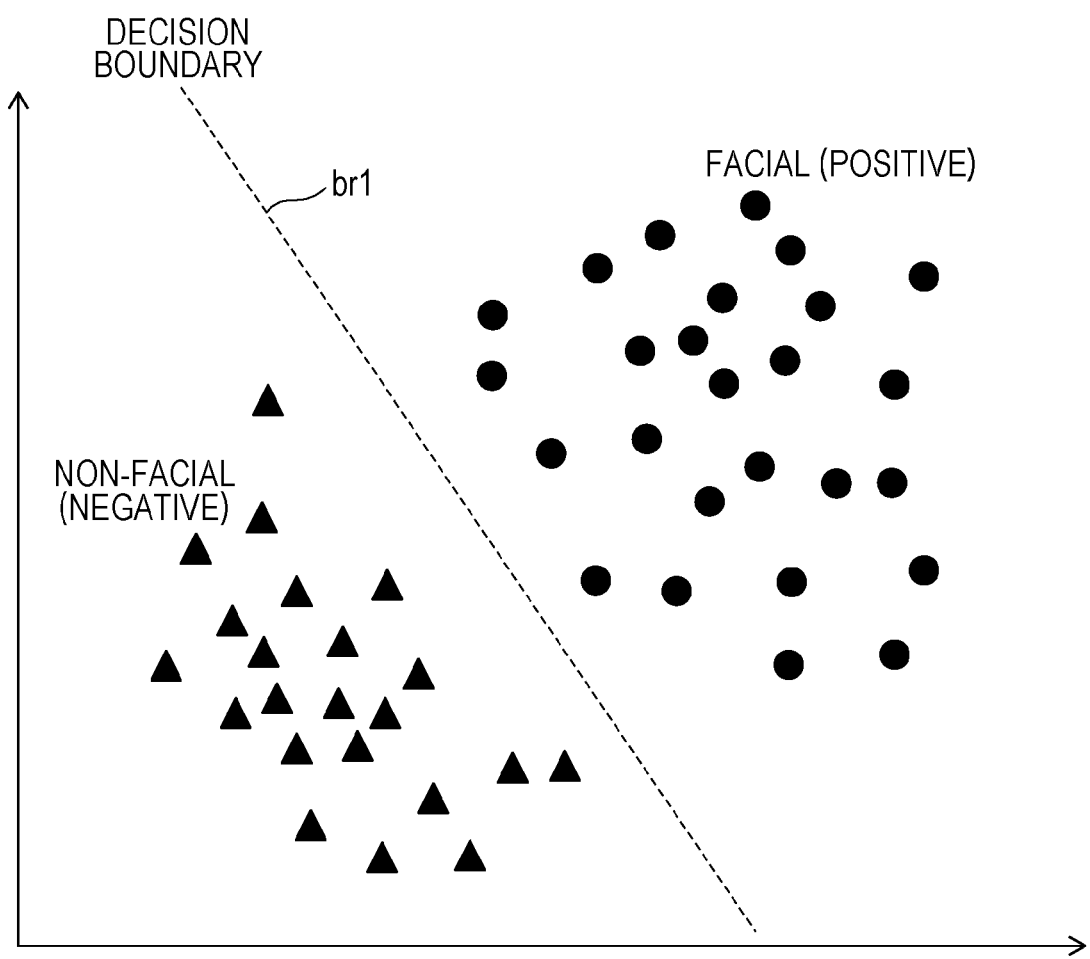
FIG. 9 illustrates a two-dimensional feature vector space that is an example of an example space X.

The division of the example space by the weak classifier will be described. FIG. 9 illustrates a two-dimensional feature vector space that is an example of the example space X. In FIG. 9, a group of circles on the right side of the two-dimensional feature space represent distribution facial feature vectors. A group of triangles on the left side of the two-dimensional feature space represent distribution of non-facial feature vectors. Each circle is a sample showing a facial feature, and each triangle is a sample showing a non-facial feature. A broken line br1 is a decision boundary for dividing the feature vector space into two sub-spaces. The gradient of the decision boundary in the two-dimensional feature space is defined such that the plurality of samples in the feature vector space are classified into facial samples and non-facial samples.

Figure 10:
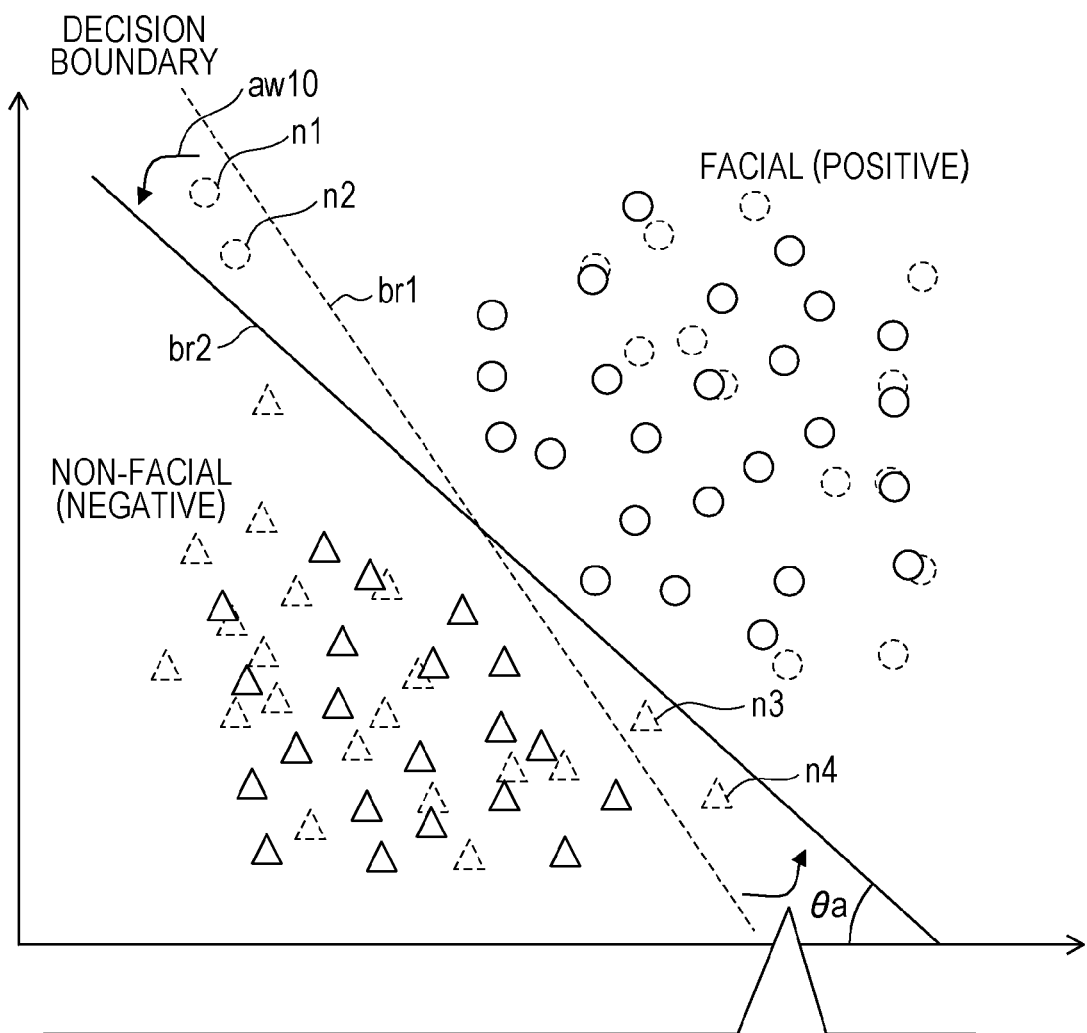
FIG. 10 illustrates a change of a decision boundary through additional learning.

FIG. 10 illustrates a change of the decision boundary through additional learning. Broken circles and broken triangles are training data supplied during additional learning. n1 and n2 in the figure are training data that should be classified as a facial feature vector, but has classified as non-facial feature vector due to the decision boundary br1. n3 and n4 in the figure are training data that should be classified as a non-facial feature vector, but has classified as non-facial feature vector due to the decision boundary br1.

aw10 represents a change of the gradient of the decision boundary according to the existence of n1, n2, n3, and n4. Through the change, the decision boundary is shifted by an angle $\theta a$ to become a decision boundary br2 expressed as a solid line.

The division of the example space by the weak classifier is performed by clustering of the feature vectors in addition to the decision boundary.

Figure 11:
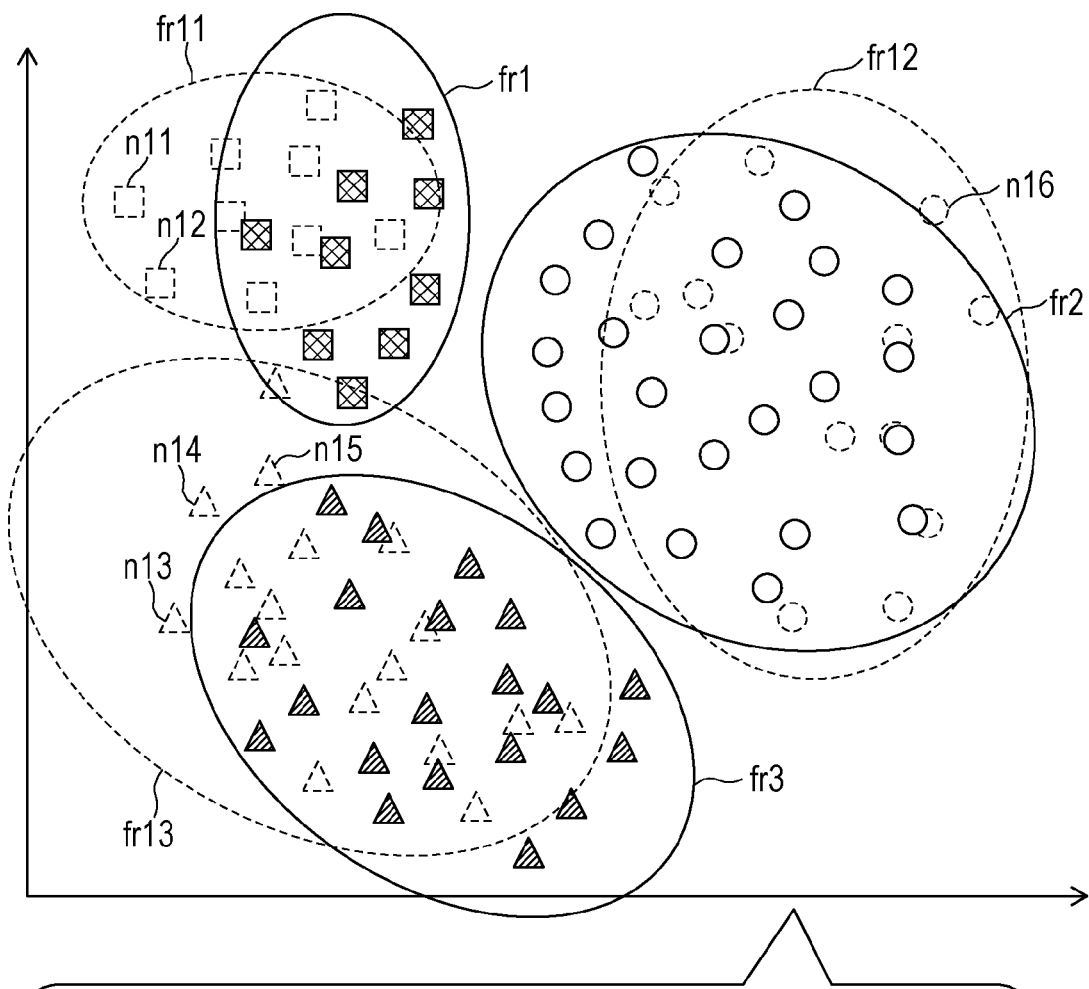
FIG. 11 illustrates subgroups (clustering) of feature vectors.

FIG. 11 illustrates subgroups (clustering) of feature vectors. A group of rectangles, a group of triangles, and a group of circles each represent distribution of feature vectors in the two-dimensional feature space. Solid frames fr1, fr2, and fr3 are clustering boundaries for classifying the distribution of the feature vectors into N classes (N=3). The broken triangles, rectangles, and circles are new training data acquired during on-line learning, and n11, n12, n13, n14, and n15 are training data that is not classified into proper classes because the clustering boundaries are set as fr1, fr2, and fr3. The additional learning in FIG. 11 functions to classify the training data into proper classes. fr11, 12, and 13 represent nonlinear clustering boundaries defined to surround n11, n12, n13, n14, and n15 through additional learning. Even when training data that is not properly occurs due to a change of the imaging environment, the data can be properly classified by changing the clustering boundaries as described above. The detector has been described above. Subsequently, the parameter manager 140 will be described.

Figure 12:
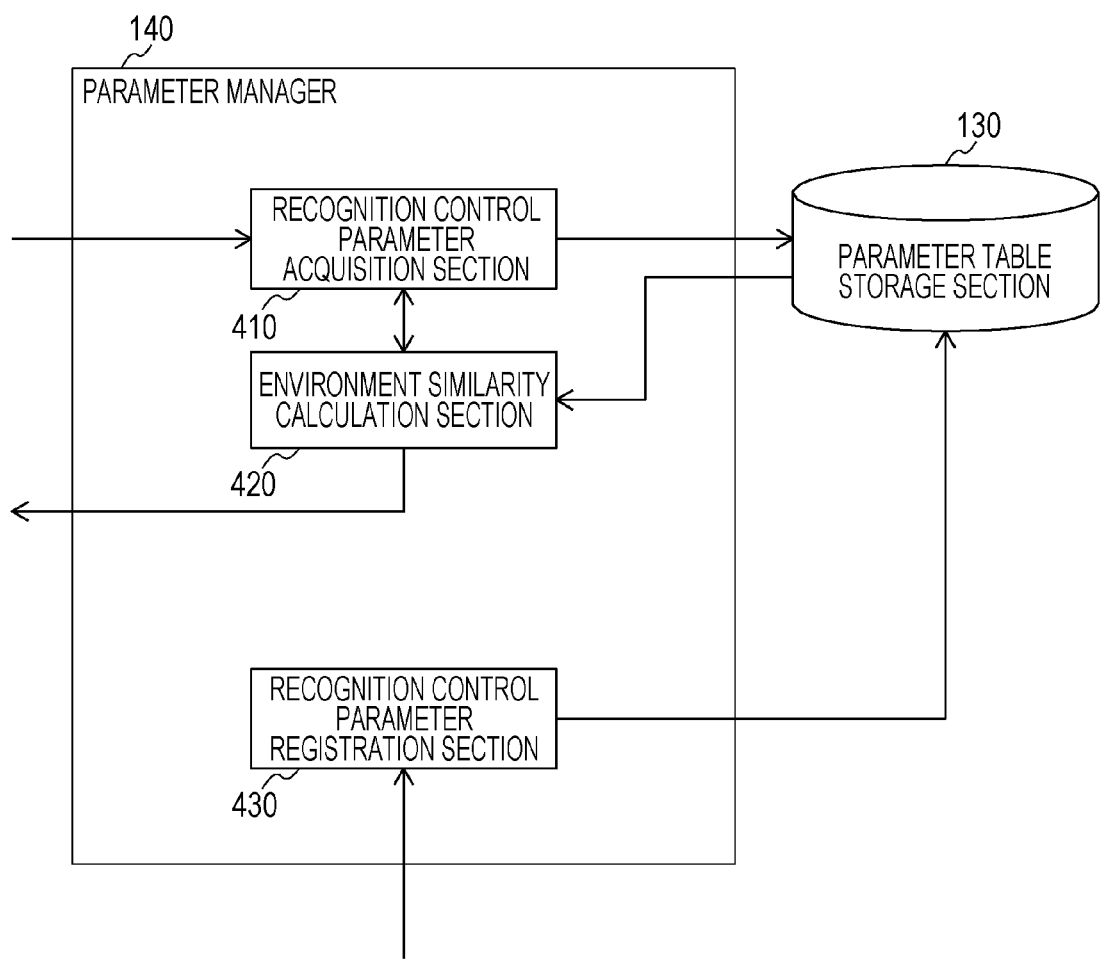
FIG. 12 is a view illustrating internal configuration of a parameter manager.

FIG. 12 is a view illustrating internal configuration of the parameter manager 140. The parameter manager 140 includes a recognition control parameter acquisition section 410, an environment similarity calculation section 420, and a recognition control parameter registration section 430.

The recognition control parameter acquisition section 410 searches whether or not the imaging environment parameter that is identical or similar to the current imaging environment parameter of the camera device as one of the particular-pattern recognition devices 111 to 114 is present in the parameter table. The environment similarity calculation section 420 performs this search by calculating similarity between the current imaging environment parameter and the imaging environment parameter described in each record in the parameter table. When the similarity of the imaging environment parameter, which is calculated by the environment similarity calculation section 420, is higher than a predetermined threshold, the recognition control parameter that is identical or similar to the current imaging environment parameter is present in the parameter table. When the number of such imaging environment parameters is only one, the recognition control parameter corresponding to the imaging environment parameter is transmitted as the current recognition control parameter to one of the particular-pattern recognition devices 111 to 114 that is the request source camera device. When a plurality of imaging environment parameters having similarity exceeding the threshold are present, the imaging environment parameter having the highest similarity is transmitted as the current recognition control parameter to one of the particular-pattern recognition devices 111 to 114 as the request source camera device.

When the similarity between the current imaging environment parameter and the imaging environment parameter in the parameter table is less than the threshold in any imaging environment parameter, the recognition control parameter acquisition section 410 causes the recognition control parameter calculation sections 121 and 122 to calculate the detector suitable for the current imaging environment parameter. When the detector is calculated, the recognition control parameter acquisition section 410 causes the recognition control parameter calculation sections 121 and 122 to calculate the recognition control parameter corresponding to the detector, and instruct the recognition control parameter registration section 430 to add the current imaging environment parameter and the newly calculated recognition control parameter to the parameter table. In addition, the recognition control parameter is transmitted to the request source camera device among the particular-pattern recognition devices 111 to 114, and stores the recognition control parameter as the current recognition control parameter in the recognition control parameter holding section 204 of the camera device.

When at least one imaging environment parameter having similarity exceeding the threshold is present, the environment similarity calculation section 420 transmits the recognition control parameter corresponding to the imaging environment parameter, as the searched recognition control parameter, to the request source camera device among the particular-pattern recognition devices 111 to 114. On the request source side, the imaging environment parameter holding section 206 stores the current imaging environment parameter, the recognition control parameter holding section 204 holds the recognition control parameter transmitted from the environment similarity calculation section 420 of the parameter manager 140 as the current recognition control parameter, and the identification execution section 203 executes identification processing using the detector indicated by the current recognition control parameter.

When the imaging environment parameter is transmitted from any of the particular-pattern recognition devices 111 to 114, the recognition control parameter registration section 430 searches whether or not an identical or similar imaging environment parameter is present in a plurality of records in the parameter table. Whether or not the identical or similar imaging environment parameter is present is determined by calculating similarity between imaging environment parameters and comparing the calculated similarity with a threshold. When all information elements of the imaging environment parameter in the records in the parameter table are identical to all information elements of the newly inputted imaging environment parameter, some information elements of the imaging environment parameter in the records in the parameter table are identical to as some information elements of the newly inputted imaging environment parameter, or some information elements of the imaging environment parameter in the records in the parameter table are similar to some information elements of the newly inputted imaging environment parameter, it is determined that the identical or similar imaging environment parameter is present in the parameter table. When the identical or similar imaging environment parameter is present, a record including the newly inputted imaging environment parameter, the classification ID indicating the same group as the existing classification group, and the assessment information is added to the parameter table.

When the identical or similar imaging environment parameter is not present, a record including the newly inputted imaging environment parameter, the classification ID indicating a new classification group, and the assessment information are added to the parameter table. In the case where it is no need to add a new parameter to the parameter table storage section 130, the recognition control parameter registration section 430 may be omitted.

When similarities between the current imaging environment parameter and the imaging environment parameters in the parameter table fall below a threshold, the recognition control parameter calculation sections 121 and 122 select the recognition control parameter having the highest similarity among the plurality of imaging environment parameters in the parameter table, and calculate the detector on the basis of the detector indicated by the recognition control parameter.

Figure 13:
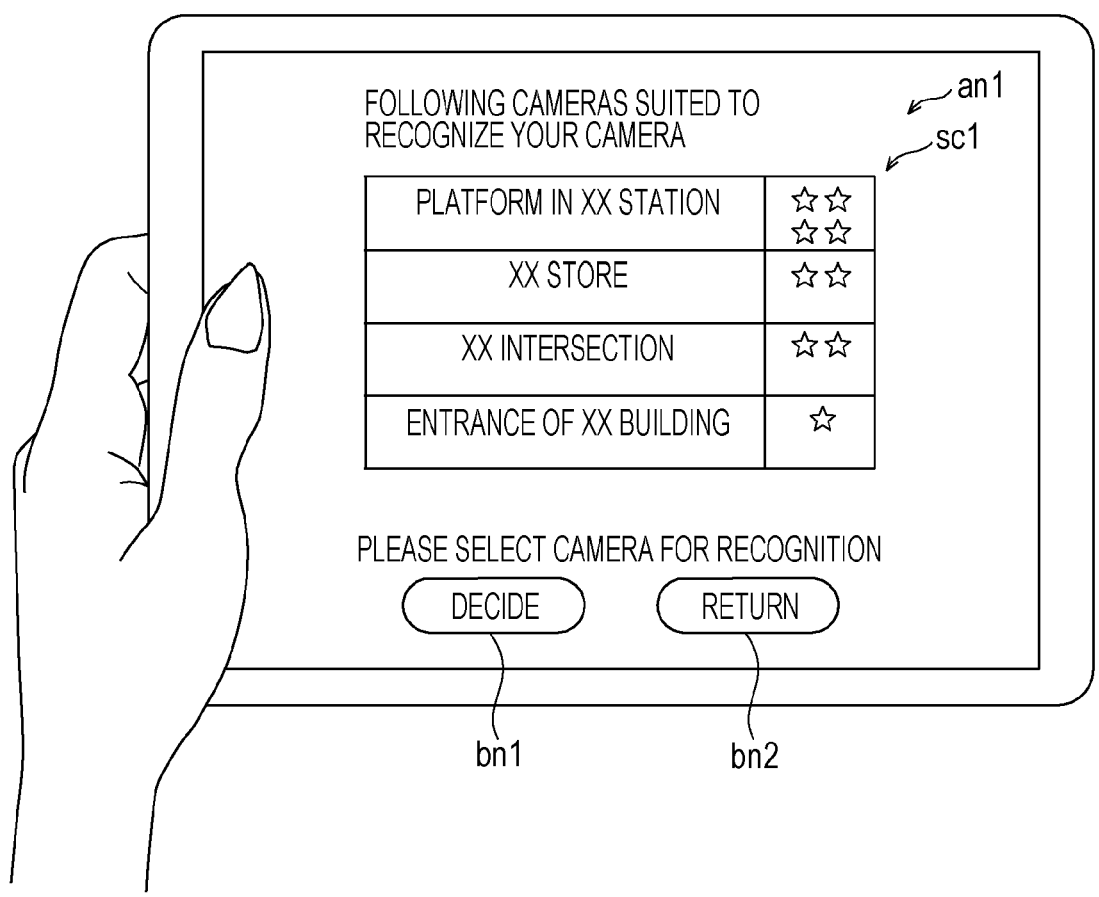
FIG. 13 illustrates a dialogue screen presented to the user of a terminal device at setting of a recognition control parameter to the camera device.

According to the search for the recognition control parameter by the parameter manager 140, the recognition control parameter is set to the particular-pattern recognition devices 111, 112, 113, and 114 as camera devices. Here, the terminal devices 151, 152, 153, and 154 can accept contrasting operations from the user to introduce natural person's determination into the selection. FIG. 13 illustrates a dialogue screen presented to the user of the terminal device at setting the recognition control parameter to the camera device. The dialogue screen includes an announce an1 informing that the recognition control parameter is searched for on the imaging environment of the camera device, a search result list sc1 for requesting the user to select one from a plurality of imaging environments, and buttons bn1 and bn2 for accepting whether or not selection in the search result list is fixed. In the search result list, an assessment symbol (star in the figure) is assigned to the imaging environment corresponding to the imaging environment parameter determined to have similarity exceeding the threshold in the search of the recognition control parameter manager 140. The number of the assessment symbols is set according to the number of recognitions indicated as the assessment information in the records in the parameter table, and processing time. The imaging environments corresponding to the imaging environment parameters classified into one group are collectively presented to the user because the similarities are identical or similar. Thus, the user as the system manager can preferably determine the camera device of which imaging environment and which imaging environment are made uniform.

The constituents of the camera system has been described.

Subsequently, a whole processing procedure of the camera system will be described with reference to flow charts in FIG. 14 to FIG. 16.

Figure 14:
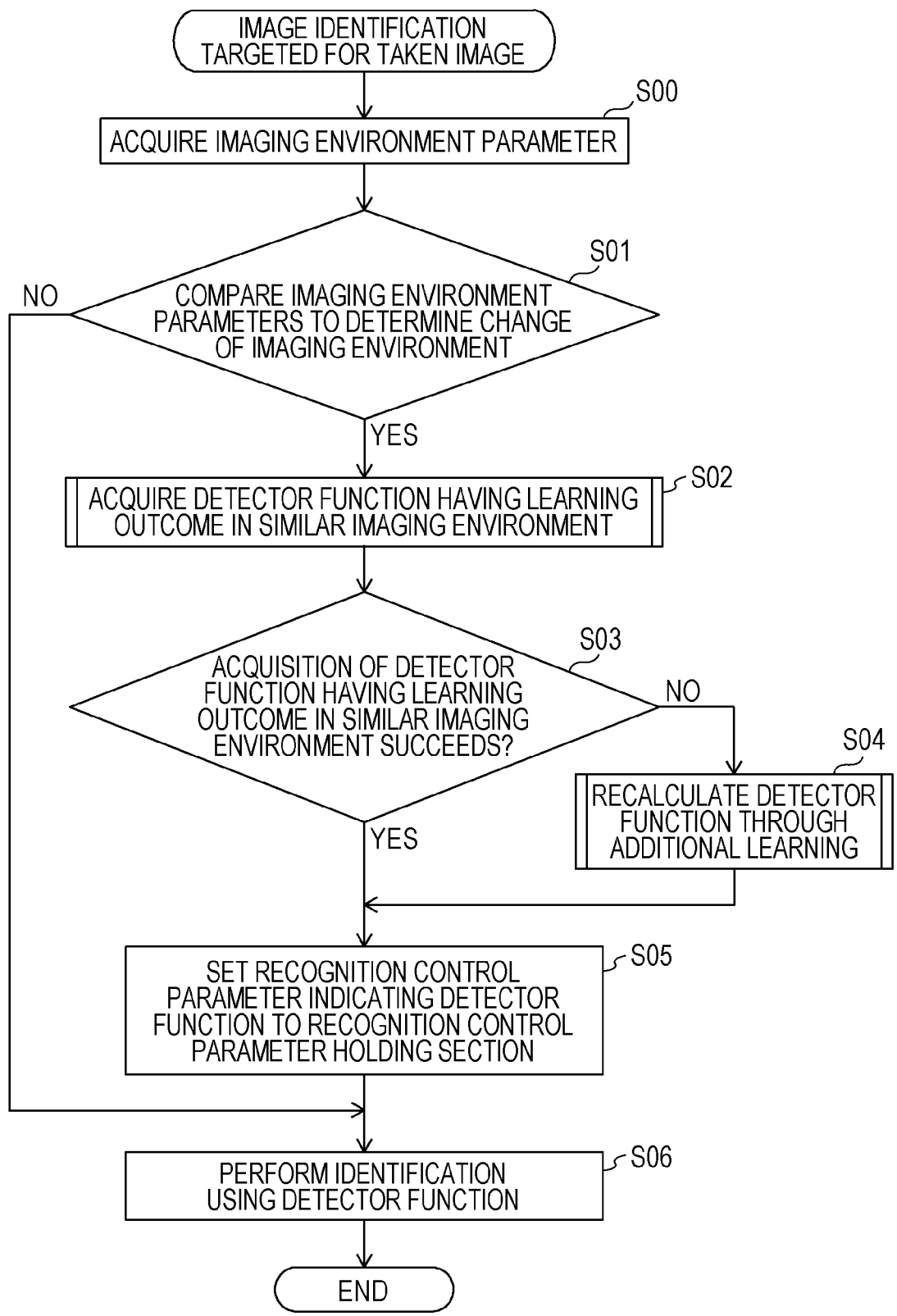
FIG. 14 is a flow chart illustrating an image identification procedure for a taken image.

FIG. 14 is a flow chart illustrating image identification targeted for a taken image. First, in the particular-pattern recognition devices 111 to 114, the imaging environment parameter acquisition section 202 acquires the imaging environment parameter including the illumination orientation, the object size, and the object orientation (Step S00). At this time, in this embodiment, the image acquired by the imaging section 201 is processed to acquire the illumination orientation, the object size, and the object orientation. It is assumed that the imaging environment parameter acquired in this embodiment is the light orientation, the target object size, and the target object orientation. However, they are only examples, and contents of the imaging environment parameter are not limited to them.

Next, the imaging environment parameter comparison section 205 compares the imaging environment parameter acquired by the imaging environment parameter acquisition section 202 with the previous imaging environment parameters held in the imaging environment parameter holding section 206, and determines presence or absence of a change of the imaging environment (Step S01).

When the Euclidean distance between the imaging environment parameters is a threshold or more (Step S01), it is determined that the environment changes. In the case where a new camera device (a particular-pattern recognition device other than the particular-pattern recognition devices 111 to 114) is added to the camera system, there is no imaging environment parameter held in the imaging environment parameter holding section 206, it is determined that the imaging environment parameter changes at all times (YES in Step S01). When it is determined that the environment does not change (NO in Step S01), the identification execution section 203 identifies the particular pattern in the image taken by the imaging section 201 to perform pattern identification of the taken image (Step S06).

On the contrary, when it is determined that the environment changes (YES in Step S01), a detector having the leaning outcome in the similar imaging environment is acquired (Step S02). To acquire the detector, the change of the imaging environment is informed to the parameter manager 140, and the recognition control parameter indicating the detector corresponding to the changed imaging environment is received.

When the acquisition of the detector having the leaning outcome in the similar imaging environment succeeds (YES in Step S03), the recognition control parameter indicating the detector is set to the recognition control parameter holding section 204 of the particular-pattern recognition devices 111 to 114 (Step S05). Conversely, the acquisition of the similar recognition control parameter fails (NO in Step S103), the detector is recalculated by additional learning (Step S04). Also when additional learning in the recognition control parameter calculation sections 121 and 122 is completed to acquire a new recognition control parameter, the recognition control parameter indicating the detector is registered in the parameter table storage section 130 (Step S05). That the acquisition of the recognition control parameter fails in Step S03 includes the case where data on the similar imaging environment is not present in the parameter table. Because additional learning of the detector is performed only when the acquisition of the recognition control parameter fails, the frequency of such additional learning is suppressed.

Finally, the identification execution section 203 performs pattern identification by use of the strong classifier of the detector identified by the recognition control parameter held in the recognition control parameter holding section 204 (Step S06). The procedure of the whole processing of the camera system in this embodiment has been described above. Next, details of the procedure of processing of acquiring the recognition control parameter by the parameter manager 140 in Step S02 in FIG. 14 will be described. FIG. 15 is a flow chart illustrating an example of a procedure of acquiring the recognition control parameter.

First, the parameter manager 140 acquires a new imaging environment parameter Pe from the imaging environment parameter comparison section 205 of the particular-pattern recognition devices 111 to 114, assigns a weight to the imaging environment parameter Pe acquired from the particular-pattern recognition devices 111 to 114 by a following equation 1, and normalizes the parameter so as to fall in the scope of 0 to 255 (Step S100).

$$P_e = \frac{P_e}{P_{eMAX}} \times 255 \times w \qquad \text{[Equation 1]}$$

Here, the weight is set to make the imaging environment parameter to be preferentially set large. For example, in face detection, it is desirable to set large weights assigned to the illumination orientation and the face orientation that largely affect the detection rate. Next, the parameter manager 140 causes the recognition control parameter acquisition section 410 to acquire an $i^{th}$ element, that is, an imaging environment parameter Pt+i from the parameter table storage section 130 (Step S101). After that, the environment similarity calculation section 420 calculates similarity Sim between the imaging environment parameter Pe and the imaging environment parameter Pt+i. To calculate similarity, for example, a following method can be adopted. The Euclidean distance dp between the normalized imaging environment parameter Pe and the imaging environment parameter Pt+i that is previously normalized and stored in the parameter table is calculated by a following equation 2, and the reciprocal is found as the similarity Sim by a following equation 3 (Step S102).

$$d_p = \sqrt{(P_{e1} - P_{t1})^2 + (P_{e2} - P_{t2})^2 + \ldots} \qquad \text{[Equation 2]}$$

$$Sim = \frac{1}{1 + d_p} \qquad \text{[Equation 3]}$$

Upon calculation of similarity, it is determined whether or not the calculated similarity Sim is larger than a threshold Thp (Step S103). The threshold Thp used herein can be any value of 0 to 1. The threshold Thp becomes 1 when the two imaging environments match each other. When Sim is larger than the threshold (YES in Step S103), it is determined that the two imaging environments are similar imaging environments, and the recognition control parameter acquisition section 410 acquires the recognition control parameter corresponding to the imaging environment parameter Pt+i from the parameter table storage section 130 (Step S105).

When the calculated similarity Sim is smaller than the threshold Thp (NO in Step S103), it is determined whether or not it has reached a last record in the parameter table (Step S104). When it has not reached, a variable i is incremented (Step S106), the recognition control parameter acquisition section 410 acquires the imaging environment parameter Pt+i from the parameter table storage section 130 (Step S101), and the environment similarity calculation section 420 calculates similarity between the imaging environment parameters (Step S102). Thereafter, the processing from Step S101 to Step S103 is repeated. When it reaches the last record in the parameter table, the procedure proceeds to Step S107. In Step S107, it is determined whether or not the imaging environment parameter having the similarity Sim exceeding the threshold Thp is present. When such imaging environment parameter is present, in Step S108, it is determined whether or not a plurality of imaging environment parameters having the similarity Sim exceeding the threshold Thp are present. When they are present, the recognition control parameter corresponding to the imaging environment parameter having the highest similarity Sim is transmitted to the particular-pattern parameter recognition device as the request source (Step S110). When only one imaging environment parameter having the similarity Sim exceeding the threshold Thp is present, in Step S109, the recognition control parameter corresponding to the only one imaging environment parameter is transmitted to the particular-pattern parameter recognition device as the request source.

When the imaging environment parameter having the similarity Sim exceeding the threshold Thp is not present, the recognition control parameter corresponding to the imaging environment parameter having the highest similarity Sim is transmitted to the recognition control parameter calculation sections 121 and 122, and leaning based on the parameter is performed (Step S111), and the recognition control parameter acquired by new learning is transmitted to the particular-pattern parameter recognition device (Step S112).

Details of the procedure of acquiring the recognition control parameter by the parameter manager 140 have been described above. Next, registration of the recognition control parameter in the parameter table storage section 130 by the parameter manager 140 at additional learning will be described.

Figure 16:
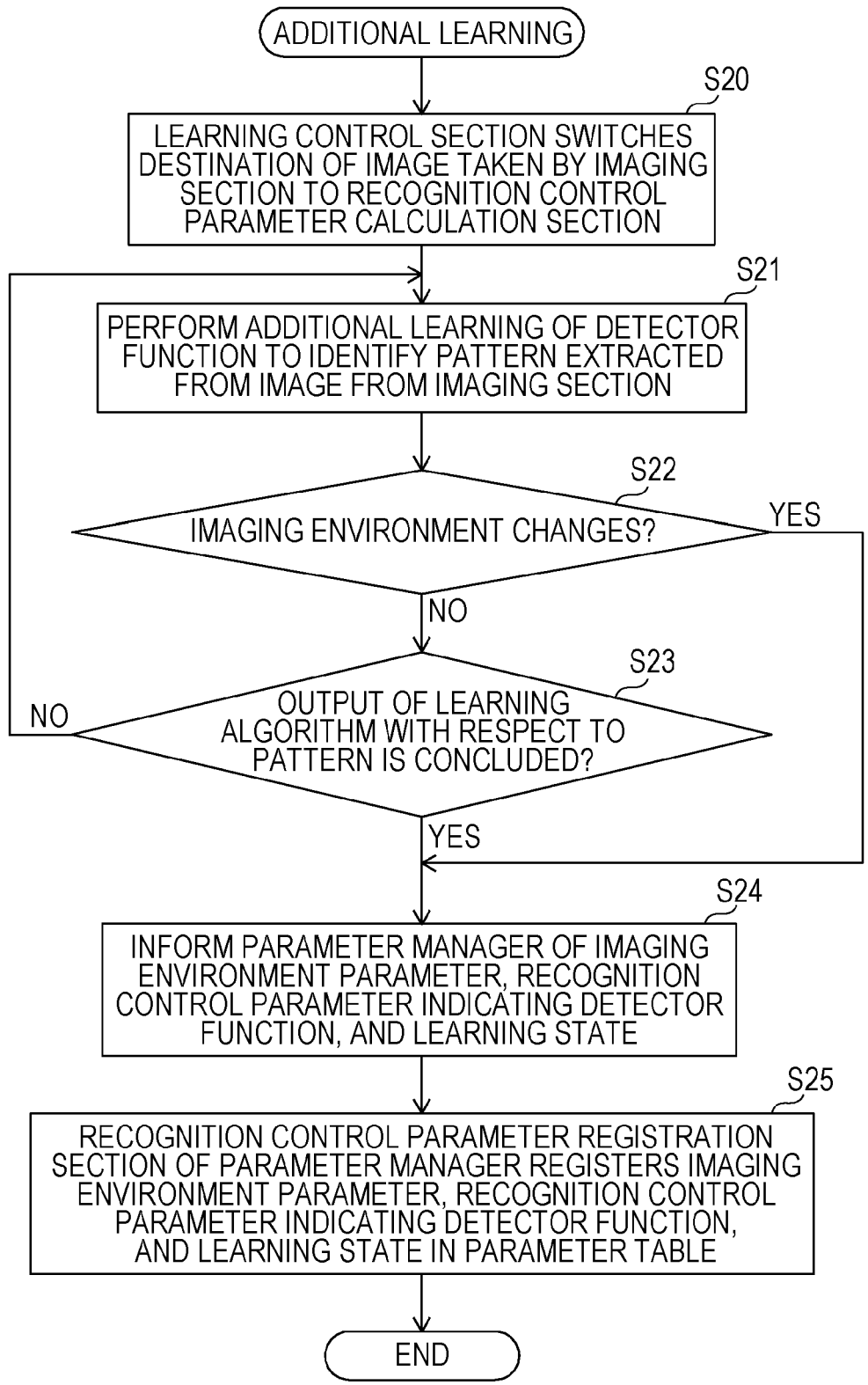
FIG. 16 is a flow chart illustrating an example of a procedure of additional learning.

FIG. 16 is a flow chart illustrating the processing procedure of additional learning. First, in the particular-pattern recognition devices 111 to 114, the learning control section 207 switches the destination of image data taken by the imaging section 201 to the recognition control parameter calculation sections 121 and 122 (Step S20). Next, additional learning of the detector is performed according to the existing learning algorithm so as to identify the particular pattern extracted from the image data from the imaging section (Step S21). During the additional learning, in the particular-pattern recognition devices 111 to 114, the imaging environment parameter acquisition section 202 acquires the imaging environment parameter, and the imaging environment parameter comparison section 205 examines a change of the imaging environment (Step S22). When the imaging environment does not change (NO in Step S22), it is determined whether or not the output of the learning algorithm is concluded (Step S23). When learning is not completed (NO in Step S23), additional learning is performed again using the image acquired from the imaging section 201 (Step S21). When it is determined that learning is completed (YES in Step S23), learning is finished. To determine whether or not learning is completed, for example, when a change of the detector stops in the recognition control parameter calculation sections 121 and 122 and a leaning result is concluded, it is determined that learning is completed.

Upon completion of learning, the imaging environment parameter stored in the imaging environment parameter holding section 202 of the particular-pattern recognition devices 111 to 114, the recognition control parameter indicating the detector calculated by the recognition control parameter calculation sections 121 and 122, and the learning state are informed to the parameter manager 140 (Step S24).

When being informed, the parameter manager 140 causes the recognition control parameter registration section 430 to register the imaging environment parameter, the recognition control parameter, and the learning state in the parameter table of the parameter table storage section 130 (Step S25). When the recognition control parameter acquired by new learning is registered in the parameter table storage section 130, the recognition control parameter registration section 430 may increase a table of the parameter table storage section 130 by one. However, when the recognition control parameter is recalculated by learning, as in the procedure of acquiring the recognition control parameter, the environment similarity calculation section must calculate similarity between the imaging environment parameters and overwrite the recognition control parameter of the matched imaging environment. When the imaging environment changes during learning (YES in Step S22), the imaging environment parameter before change, which is stored in the imaging environment parameter holding section 206 of the particular-pattern recognition devices 111 to 114, the recognition control parameter, and the learning state indicating that learning is being performed/completed are informed to the parameter manager 140 (Step S24). As at completion of learning, the recognition control parameter registration section 430 of the parameter manager 140 stores the imaging environment parameter, the recognition control parameter indicating the detector, and the learning state in the parameter table storage section 130. Thereby, when any particular-pattern recognition device experiences a change of the similar imaging environment, the additional learning can be started from the midpoint, concluding learning sooner.

The processing procedure in which the parameter manager 140 registers the recognition control parameter in the parameter table storage section 130 (S04 in FIG. 14) has been described.

As described above, with the configuration of the camera system in Embodiment 1, the particular-pattern recognition devices 111 to 114, the recognition control parameter calculation sections 121 and 122, the parameter table storage section 130, and the parameter manager 140 can acquire the optimum recognition control parameter in recognizing the particular pattern, and in the case where a certain particular-pattern recognition device is in the same environment as that of other particular-pattern recognition devices, or a new particular-pattern recognition device is added, by using the existing recognition control parameters, the number of times and loads of learning can be largely reduced, and efforts to adjust the installation environment can be largely improved.

Embodiment 2

Next, Embodiment 2 of the present disclosure will be described. In addition to Embodiment 1, camera setting of the imaging section is improved in Embodiment 2.

Figure 17:
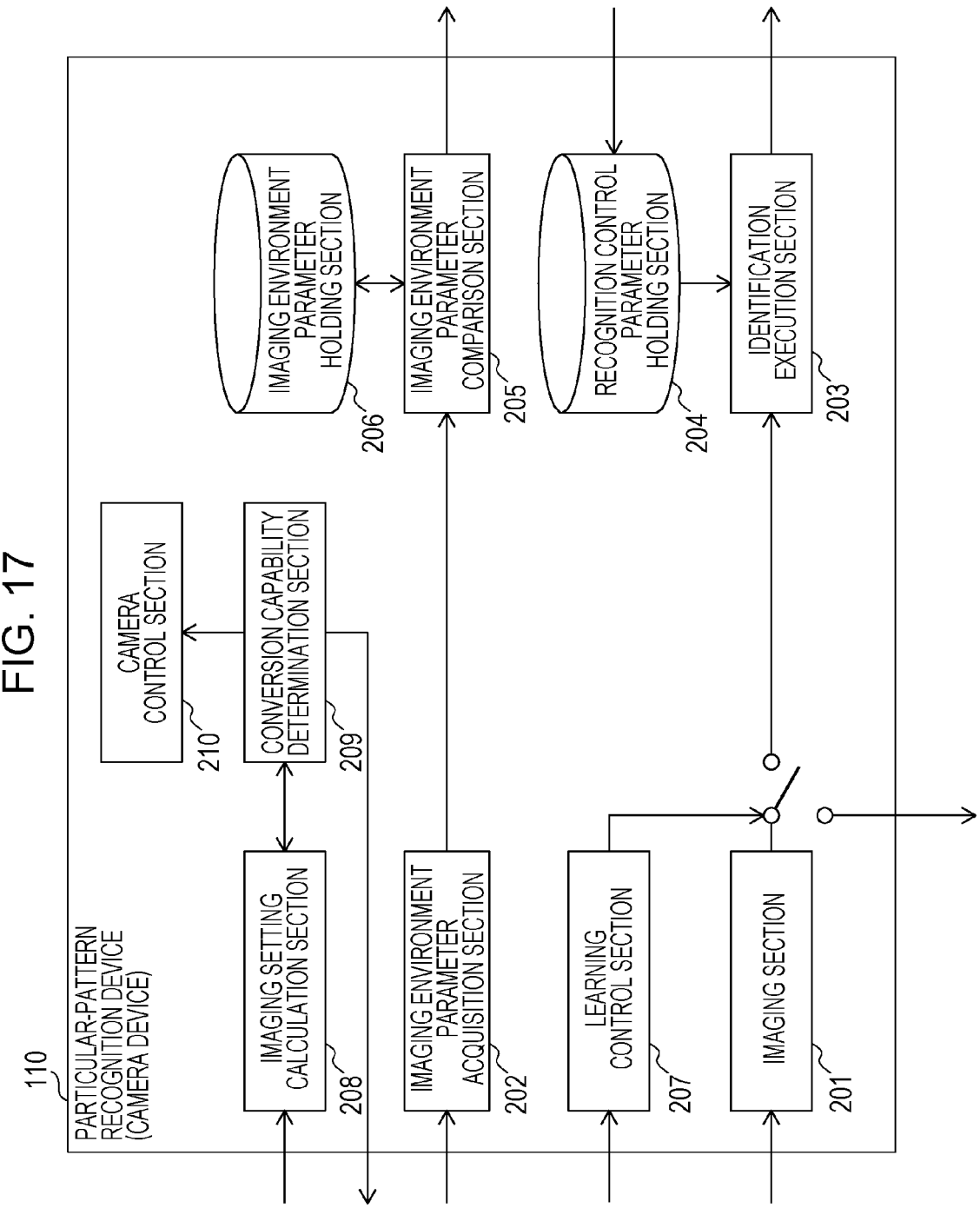
FIG. 17 is a view illustrating a particular-pattern recognition device in Embodiment 2.

FIG. 17 is a view illustrating configuration of particular-pattern recognition devices 111 to 114 in Embodiment 2 of the present disclosure. The internal configuration of Embodiment 1 is the same as that of Embodiment 2 in the imaging section 201 to the learning control section 207. Embodiment 2 is different from Embodiment 1 in that an imaging setting calculation section 208, a conversion capability determination section 209, and a camera control section 210 are provided. These are constituents for controlling the camera to have the imaging environment corresponding to any imaging environment parameter. The same constituents in FIG. 17 as those in FIG. 3 are given the same reference numerals, and description thereof is omitted.

The imaging setting calculation section 208 holds camera setting corresponding to the imaging environment parameter, and calculates how to control the camera setting when the imaging environment is changed to a certain imaging environment parameter. For example, the control corresponding to the imaging environment parameter is previously expressed in numbers, and stored in a lookup table to be used for camera setting later. By preparing a program of calculating a change of the imaging environment parameter according to control of the camera, and starting the program as appropriate, optimum camera setting can be calculated. The conversion capability determination section 209 determines whether or not control of the imaging section 201 enables conversion of the imaging environment of the imaging section 201.

The camera control section 210 controls hardware device of the camera device. Examples of the control of the hardware devices include pan tilt zoom (PTZ) control, automatic white balance (AWB) control, automatic exposure (AE) control, and automatic focusing (AF) control of the camera.

The whole processing of the camera system will be described.

Figure 18:
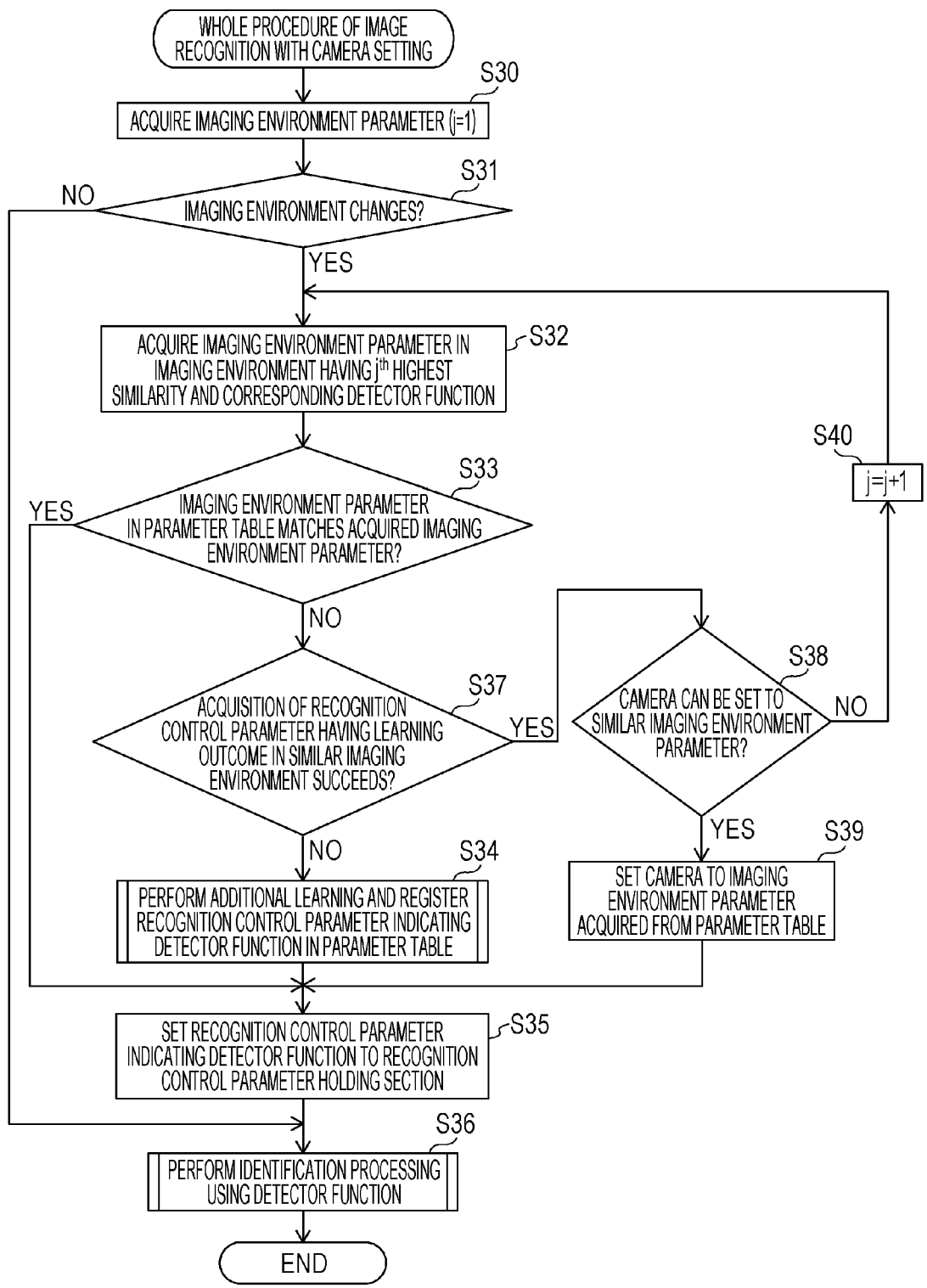
FIG. 18 is a flow chart illustrating the whole procedure of image recognition including camera setting.

FIG. 18 is a flow chart illustrating the whole procedure of image recognition by camera setting. In the camera system in Embodiment 2, first, as in Embodiment 1, the imaging environment parameter acquisition section 202 acquires a parameter of the imaging environment and initializes a variable j (Step S30). Next, the imaging environment parameter acquired in Step S30 is compared with previous imaging environment parameters held in the imaging environment parameter holding section 206, and it is determined whether or not the imaging environment changes (Step S31). When it is determined that the environment does not change (NO in Step S31), the particular pattern in the image acquired from the imaging section 201 is identified to perform pattern identification of the taken image (Step S36). When it is determined that the environment changes (YES in Step S31), the changed imaging environment parameter is informed to the parameter manager 140, and the recognition control parameter is acquired via the parameter manager 140. To acquire the recognition control parameter, as in Embodiment 1, the environment similarity calculation section 420 may calculate similarity and acquire the similar recognition control parameter. However, in Embodiment 2, unlike Embodiment 1, the imaging environment parameter having the $j^{th}$ highest similarity rather than the imaging environment parameter having the highest similarity, and the detector indicated by the corresponding recognition control parameter are acquired (Step S32). That is, similarities with all imaging environment parameters in the parameter table storage section 130 are calculated, and the recognition control parameter is sequentially acquired from the similarity Sim close to 1.

It is determined whether or not the imaging environment parameter informed to the parameter manager 140 matches the imaging environment parameter corresponding to the acquired recognition control parameter (Step S33). When the similarity Sim of the imaging environment parameter is 1, the two imaging environment parameters match each other, that is, YES in Step S33. In this case, the recognition control parameter indicating the detector is set in the recognition control parameter holding section 204 of the particular-pattern recognition devices 111 to 114 (Step S35), and the identification execution section 203 identifies the particular pattern to perform pattern identification of the taken image (Step S36).

When the similarity Sim between the imaging environment parameter informed to the parameter manager 140 and the imaging environment parameter corresponding to the acquired recognition control parameter is not 1, NO is selected in S33, and the procedure proceeds to Step S37. In Step S37, it is determined whether or not acquisition of the recognition control parameter having a leaning outcome in the similar imaging environment succeeds.

When the recognition control parameter having a leaning outcome in the similar imaging environment cannot be acquired (NO in Step S37), the additional learning is performed, and the recognition control parameter indicating the detector is registered in the parameter table (Step S34).

Even when the similarity Sim is 1 or less, in the case where the similarity Sim is larger than the threshold Thp set as any value as in Embodiment 1, and it is determined that the acquisition of the recognition control parameter having a leaning outcome in the similar imaging environment succeeds, YES is selected in S37. In this case (YES in Step S37), the conversion capability determination section 209 determines whether or not the camera in the imaging section 201 can be set to the similar imaging environment parameter (Step S38). When it is determined that the camera setting can be converted into the similar imaging environment parameter (YES in Step S38), the camera control section 210 sets the camera to the imaging environment parameter acquired from the parameter table (Step S39).

Figure 19:
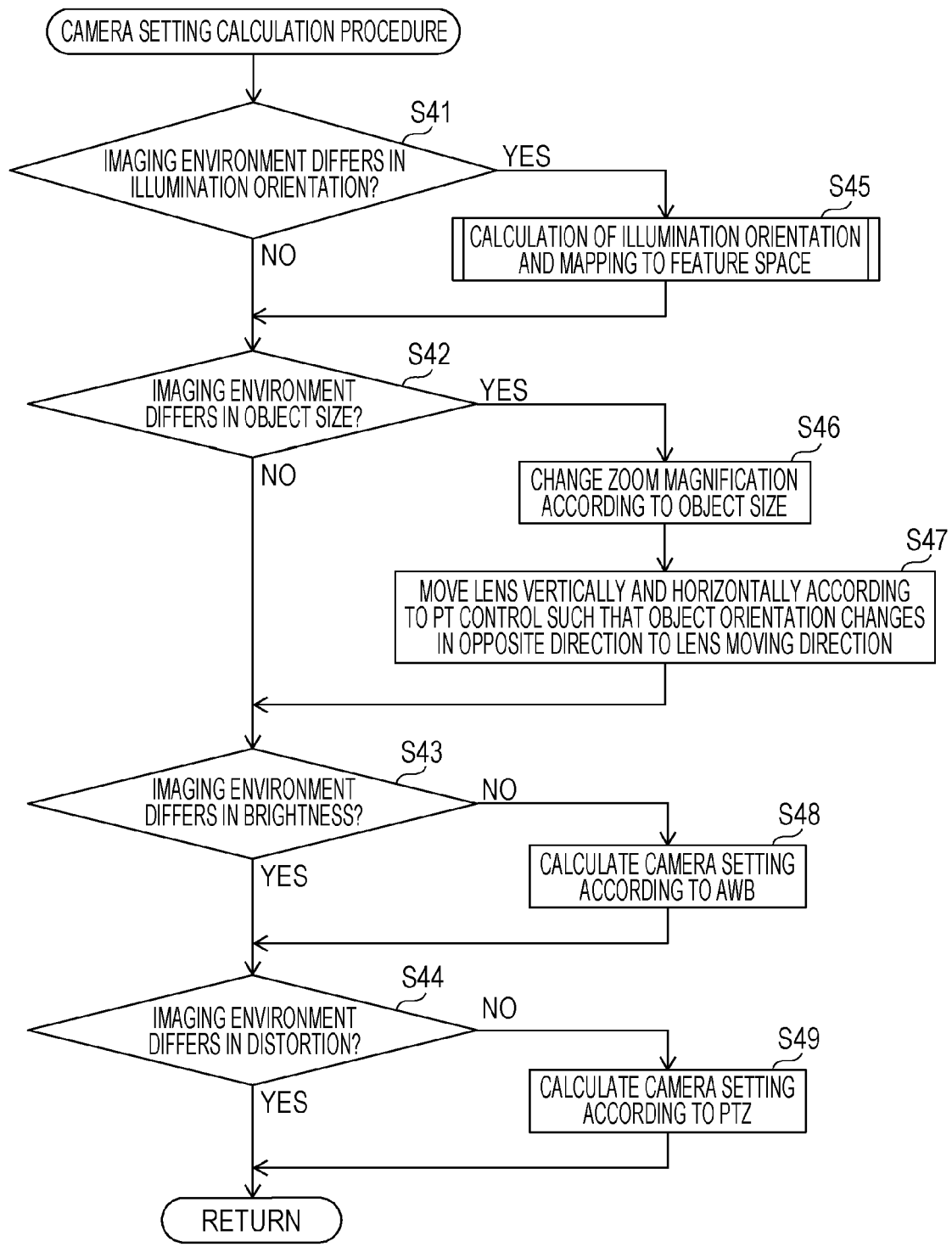
FIG. 19 is a flow chart illustrating a procedure of calculating camera setting.

Then, when the camera is thus set, the detector corresponding to the imaging environment parameter is set to the recognition control parameter holding section 204 of the particular-pattern recognition devices 111 to 114 (Step S35), the identification execution section 203 identifies the particular pattern to perform pattern identification of the taken image (Step S36). When it is determined that the setting cannot be converted (NO in Step S38), the variable j is incremented (Step S40), the imaging environment parameter having the $j^{th}$ highest similarity and the corresponding detector that is the recognition control parameter are acquired (Step S32) and similar processing is executed. Examples of values used as the imaging environment parameter include brightness, illumination orientation, distortion, shake, target object size, and target object orientation. because illumination orientation, target object size, target object orientation are used according to the face detection technique in this embodiment, the method of calculating the camera setting on the three parameters will be described below. FIG. 19 is a flow chart illustrating a procedure of calculating camera setting.

In Step S41, it is determined whether or not the imaging environment differs in illumination orientation. When the imaging environment differs in illumination orientation, calculation of the illumination orientation and mapping to the feature space are performed (Step S45). In Step S42, it is determined whether or not the imaging environment differs in object size or orientation. When the imaging environment differs in object size, calculation of zoom (Z) control is performed (Step S46). Because the object size changes by the zoom magnification according to zoom control, the camera can be set to change zoom magnification according to the object size. As to the object orientation, PTZ control is similarly used. That is, in Step S47, by moving the lens of the imaging section 201 vertically and horizontally according to pan tilt (PT) control, the object orientation is changed in the opposite direction to the lens moving direction. Using this, the camera setting value can be calculated. However, because the object orientation changes according to PT control depending on the zoom magnification, it is desirable to map the object orientation on the three-dimensional feature space including PTZ. In Step S43, it is determined whether or not the imaging environment differs in brightness. When the imaging environment differs in brightness, camera setting is calculated according to AWB control (Step S48).

Figure 20:
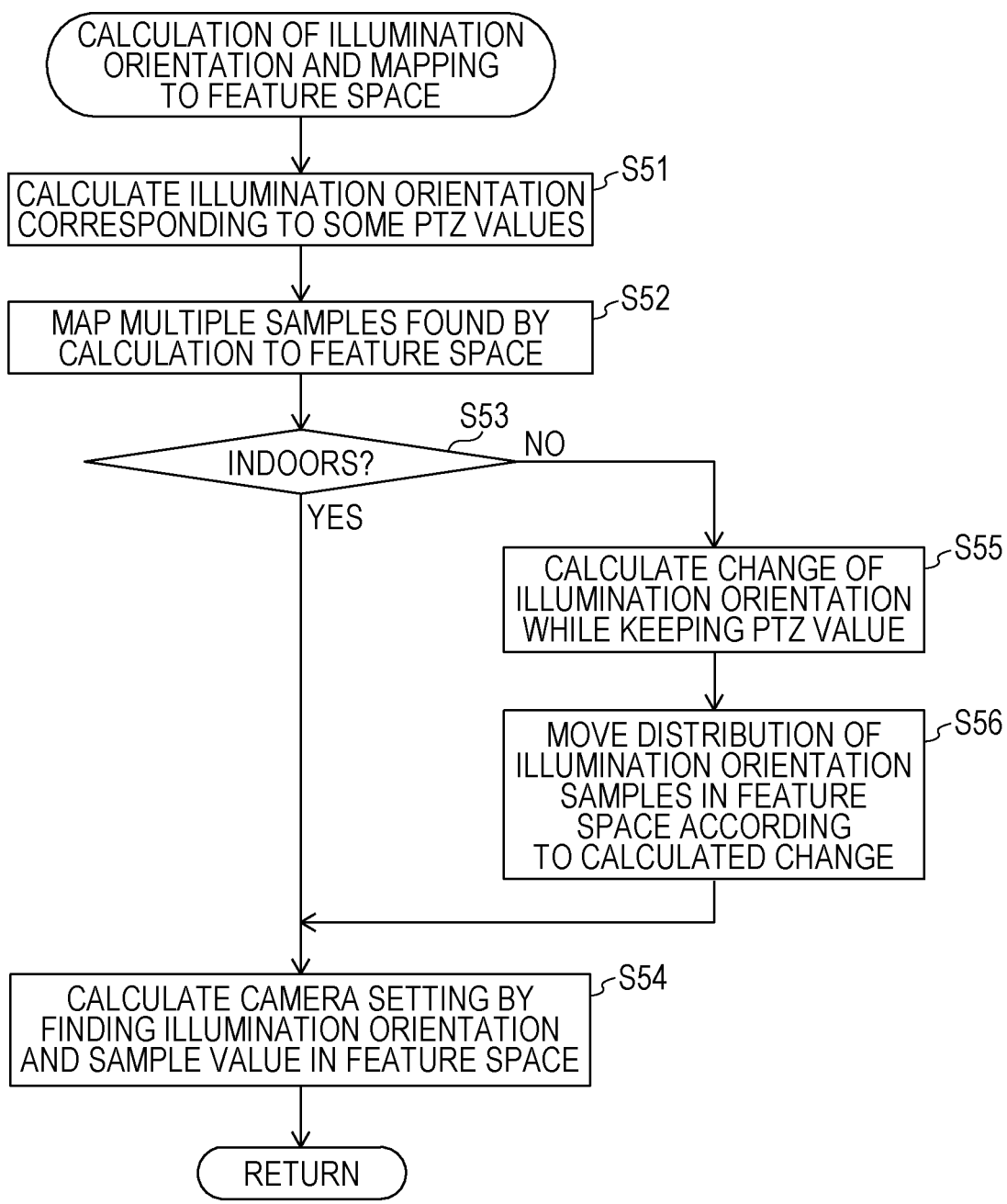
FIG. 20 is a flow chart illustrating an example of calculation of illumination orientation and mapping to a feature space.

In Step S44, it is determined whether or not the imaging environment differs in only distortion. When the imaging environment differs in distortion, calculation is made according to PTZ control (Step S49). As to the illumination orientation, camera setting is calculated according to PTZ control. According to PTZ control, the lens of the imaging section 201 can be moved vertically and horizontally, and a telephoto lens or a wide-angle lens can be used. Using these mechanisms, the illumination orientation corresponding to some PTZ values is calculated. FIG. 20 is a flow chart illustrating a procedure of calculation of the illumination orientation and mapping to the recognition space.

First, illumination orientation corresponding to some PTZ values is calculated (Step S51). The calculation procedure is the same as that in Embodiment 1. Then, a plurality of samples acquired according to the procedure is mapped to the feature space (Step S52). The camera setting can be calculated by finding a PTZ value corresponding to illumination orientation in the feature space. However, when the imaging section is installed outdoors, it is assumed that illumination orientation changes with time. For this reason, mapping to the feature space must be changed with time. Thus, in Step S53, it is determined whether or not the camera is installed indoors.

When the camera is installed indoors, camera setting is calculated by finding a sample value of illumination orientation in the feature space (Step S54). When the camera is installed outdoors, a change of illumination orientation is calculated while keeping the PTZ value (Step S55), and distribution of illumination orientation samples in the feature space is shifted according to the calculated change (Step S56). The sample distribution of illumination orientation mapped to the feature space is moved while keeping the PTZ value by the change of illumination orientation, which is acquired by the imaging environment parameter acquisition section 202, enabling response to environment change.

Whole processing of the camera system in this embodiment has been described.

As described above, in this embodiment, the optimum recognition control parameter in recognizing the particular pattern can be acquired and used. Moreover, when the imaging environment changes, by setting the camera setting of the imaging section to be the same as other imaging environment having the known recognition control parameter, the existing recognition control parameter can be used, resulting in that the number of times and loads of learning can be largely reduced, and efforts to adjust the installation environment can be largely improved.

Embodiment 3

Next, Embodiment 3 of the present disclosure will be described. In Embodiment 3, unlike Embodiment 1, a data collection of the imaging environment parameter is divided into some subgroups each having a common feature, and the subgroups and sample data are managed in association with each other to reduce the number of managed parameters.

Figure 21:
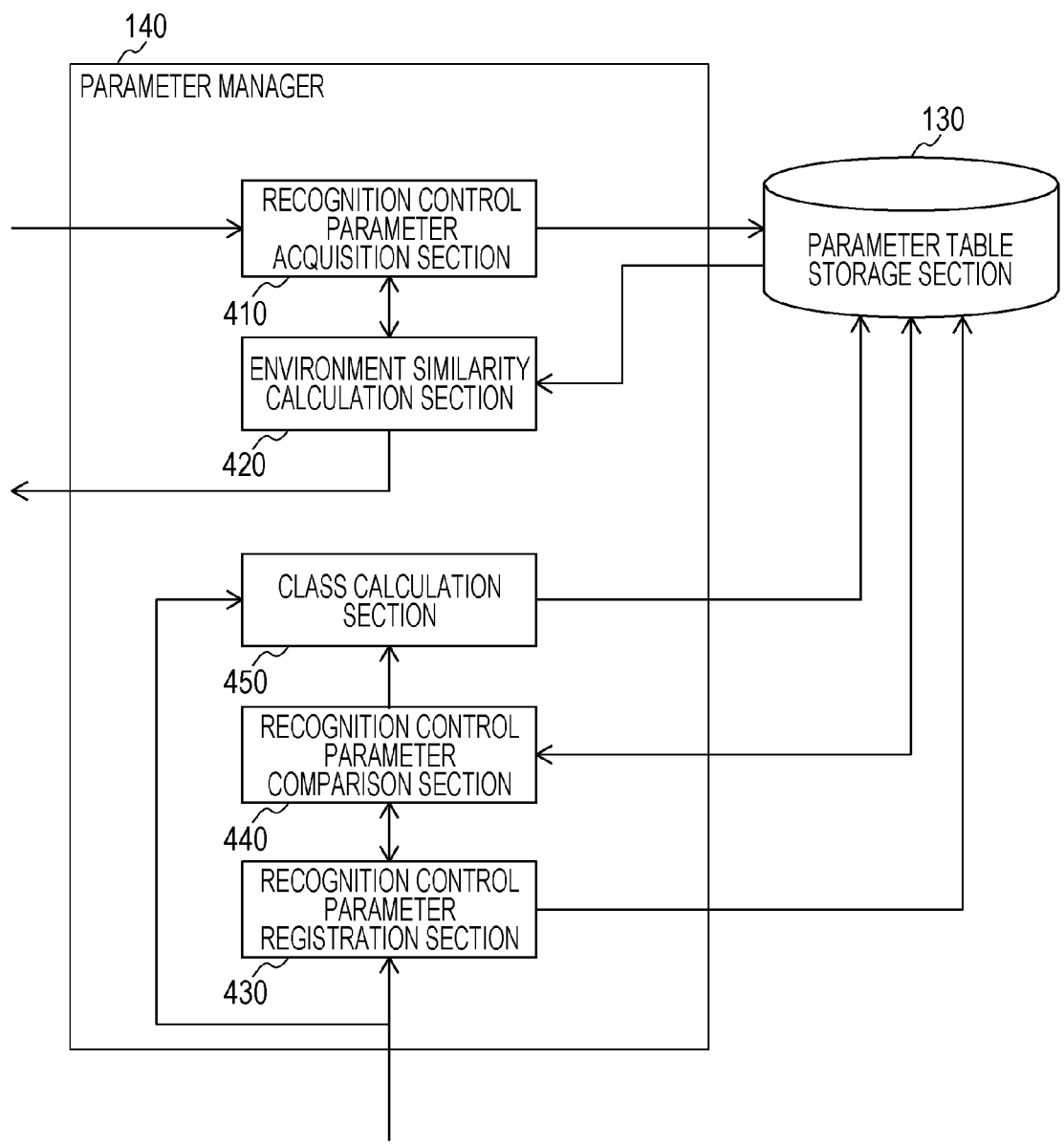
FIG. 21 is a view illustrating configuration of a parameter manager in Embodiment 3.

FIG. 21 is a view illustrating configuration of a parameter manager 140 in Embodiment 3 of the present disclosure. The parameter manager 140 in Embodiment 3 is the same as the parameter manager 140 in Embodiment 1 in the recognition control parameter acquisition section 410 to the recognition control parameter registration section 430. Embodiment 3 is different from Embodiment 1 in that a recognition control parameter comparison section 440 and a class calculation section 450 are provided. These constituents function to divide the imaging environment parameter into subgroups and manage the subgroups. Thus, Embodiment 3 of the present disclosure is different from Embodiment 1 in recognition control parameter registration processing (S25 in FIG. 16).

The recognition control parameter comparison section 440 compares two recognition control parameters, and determines whether or not the two parameters are identical to each other. The comparison method of by the recognition control parameter comparison section 440, that is, the method of comparing the two recognition control parameter will be described below. For example, in the case of the detector, some prepared data samples are inputted to each detector, and an output value acquired when each data sample is inputted is obtained. The output values thus obtained are compared, and when the output values are identical to each other, it is determined that the strong classifiers of the detectors are equal. In the case where the recognition control parameter is numerical data, it is confirmed that a difference between two parameters is 0. The method of comparing the recognition control parameters is merely an example, and any other suitable method may be used.

The class calculation section 450 performs belonging calculation on which subgroup in the feature space that an arbitrary imaging environment parameter belongs to. The result of the belonging calculation is used when the parameter registration section 430 registers a new imaging environment parameter or recognition control parameter in the parameter table storage section 130. A classification method using supervised learning can be used as the belonging calculation of the class calculation section 450. For example, SVM can be used. Next, a processing flow of Embodiment 3 of the present disclosure will be described. A basic processing flow in Embodiment 3 is similar to that in Embodiment 1. Embodiment 3 is different from Embodiment 1 in a processing flow in which the recognition control parameter registration section 430 registers the recognition control parameter. Thus, description of the same processing as that in Embodiment 1 is omitted, and only the processing flow of registering the recognition control parameter will be described below.

Figure 22:
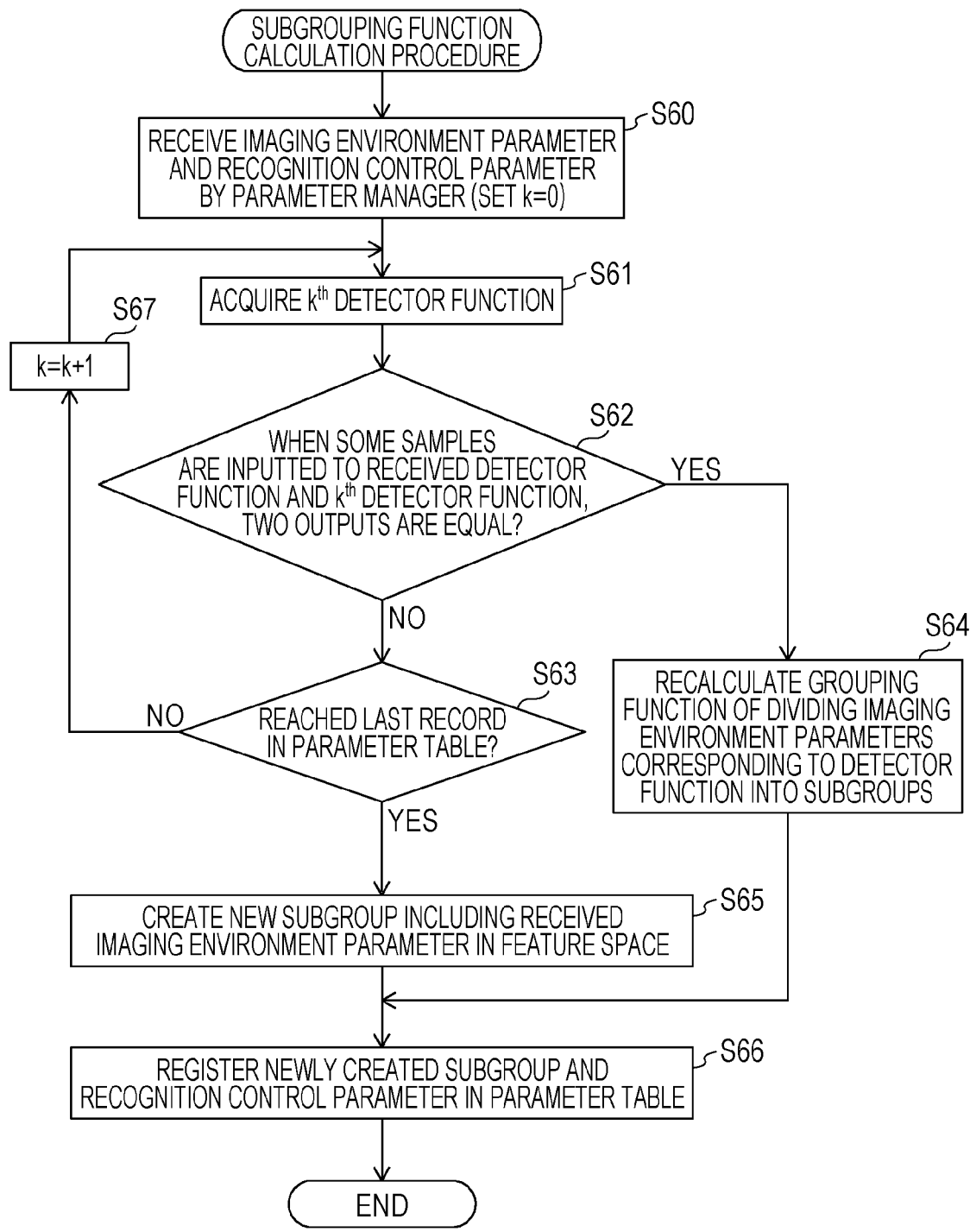
FIG. 22 is a flow chart illustrating an example of subgroup processing procedure using a subgroup function.

FIG. 22 is a flow chart illustrating a procedure of creating subgroups in Embodiment 3 of the present disclosure. In the camera system in this embodiment, as in Embodiment 1, when a new recognition control parameter is registered, the parameter manager 140 receives the imaging environment parameter and the recognition control parameter (Step S60). At this time, as in Embodiment 1, the learning state may be received in addition to the imaging environment parameter and the recognition control parameter.

Next, in the parameter manager 140, the recognition control parameter acquisition section 410 acquire the detector identified by the kth recognition control parameter from the parameter table storage section 130 (Step S61).

Some samples are supplied to the detector acquired in Step S61 and the detector received by the parameter manager 140 and then, the recognition control parameter comparison section 440 compares recognition control parameters (Step S62).

When the recognition control parameters are equal (YES in Step S62), a grouping function of dividing the imaging environment parameters corresponding to the recognition control parameter indicating the detector into subgroups is recalculated (Step S64).

When the recognition control parameters compared by the recognition control parameter comparison section 440 are not identical (NO in Step S62), it is determined whether search has reached the last record in the parameter table (Step S63). When NO is selected in S63, a variable k is incremented (Step S67), and the kth incremented recognition control parameter is acquired from the parameter table storage section 130 (Step S61). Thereafter, the recognition control parameters are compared with each other again (Step S62). At this time, when the identical recognition control parameter cannot be found although the search has reached the last record in the parameter table (YES in Step S63), a new subgroup including the imaging environment parameter received by the parameter manager 140 is created in the feature space (Step S65), and the newly created subgroup and the recognition control parameter are registered in the parameter table storage section 130 (Step S66).

As described above, in this embodiment, by dividing the data collection of the imaging environment parameter into some subgroups, and managing the subgroups and the recognition control parameter in association with each other, existing recognition control parameters can be utilized, the number of times and loads of learning can be largely reduced, efforts to adjust the installation environment can be largely improved, and the number of managed parameters can be reduced.

<Notes>

Although the preferred embodiments that can be known by applicants at filing of this application have been described, following technical topics can be father improved or modified.

(Omission of Recognition Control Parameter Calculation Sections 121 and 122)

Although the parameter table storage section 130 associates the imaging environment parameter indicating the imaging environment with recognition control parameter used for identification and holds them, in the case where the recognition control parameters corresponding all possible imaging environments are previously registered in the parameter table storage section 130, the recognition control parameter calculation sections 121 and 122 can be omitted.

(Exceptional Processing in the Case of Absence of Similar Imaging Environment in Parameter Table)

Figure 15:
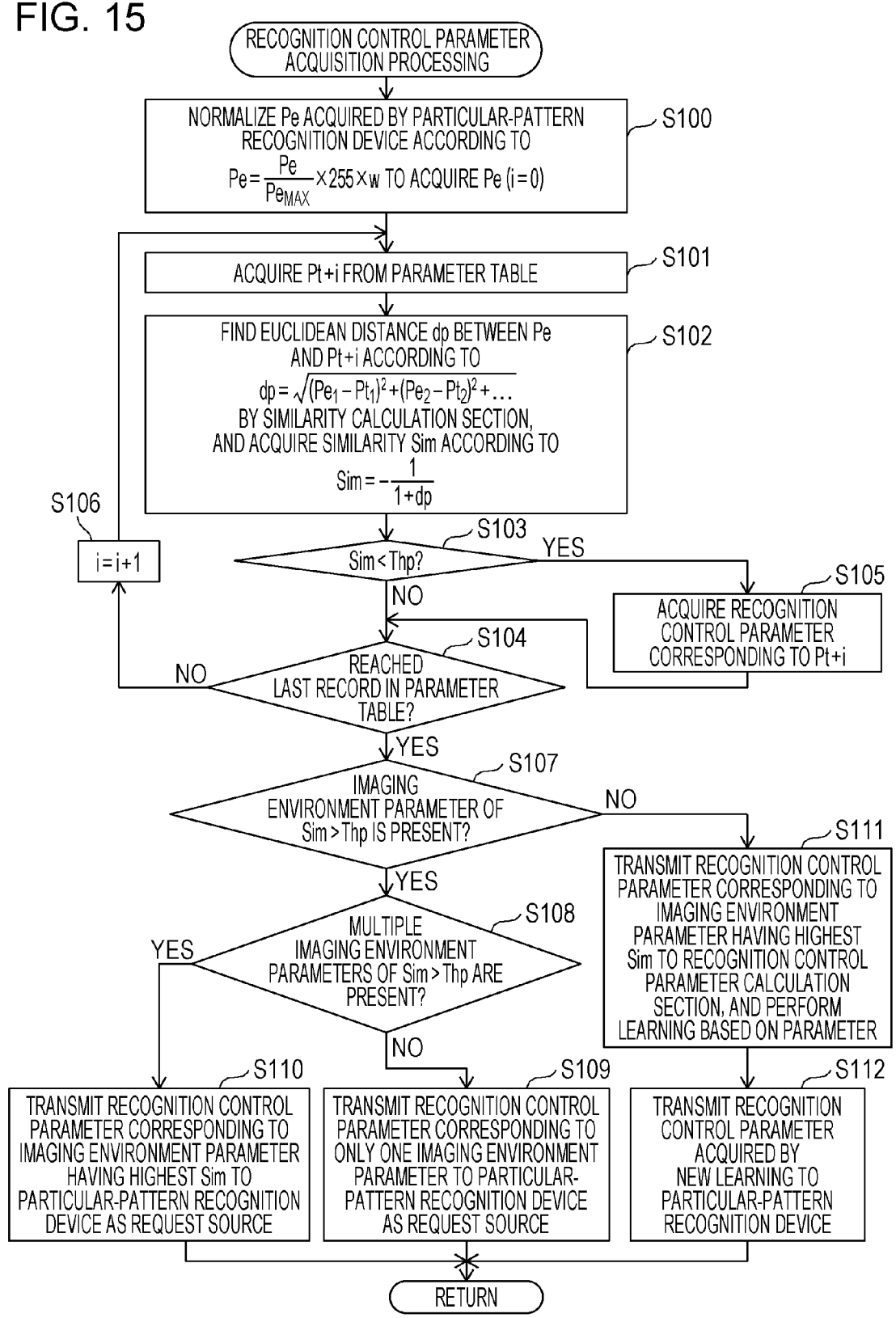
FIG. 15 is a flow chart illustrating an example of a procedure of acquiring the recognition control parameter by the parameter manager.

In S105 in the flow chart of FIG. 15, when no similar imaging environment is present in the parameter table, an error code is outputted. However, to inform that no similar imaging environment is present in the parameter table, only any information indicating absence of the similar imaging environment, other than the error, is sufficient. Further, when additional learning is not performed, even if the similarity Sim does not exceed Thp, in place of the error, the detector of the imaging environment having the highest similarity may be transmitted.

(Method of Calculating Similarity of Imaging Environment Parameter)

The method of calculating similarity of the imaging environment parameter in FIG. 15 is merely an example, and may be any other preferable calculation method. During a certain period, the imaging environment of the particular-pattern recognition device becomes often specific environment. Thus, by preparing a cache table in the parameter manager 140, and registering a frequently occurring combination of the imaging environment parameter and the recognition control parameter, the parameters can be searched for at high speed.

Constituent in Each Embodiment

The imaging section 201, the imaging environment parameter acquisition section 202, identification execution section 203, the recognition control parameter holding section 204, the imaging environment parameter comparison section 205, the imaging environment parameter holding section 206, the learning control section 207, the imaging setting calculation section 208, the conversion capability determination section 209, and the camera control section 210, which are constituents of the particular-pattern recognition devices 111 to 114, and the recognition control parameter acquisition section 410, the environment similarity calculation section 420, the recognition control parameter registration section 430, the recognition control parameter comparison section 440, and the class calculation section 450, which are constituents of the parameter manager 140, each may be configured of a microprocessor, a code ROM, or s RAM. In this case, it is desirable to describe the processing procedures in the embodiments in command codes, and store them in the code ROM.

(Acquisition of Imaging Environment Parameter by Imaging Environment Parameter Acquisition Section 202)

The acquisition of the imaging environment parameter by the imaging environment parameter acquisition section 202 may be achieved by using an illuminance sensor attached for detection of brightness, or determining brightness from the luminance of the camera image according to a program of a general circuit. Further, environment information can be acquired from the image by using a dedicated circuit such as application specific integrated circuit (ASIC) for analyzing the image acquired from the imaging section 201, a program that is stored in a code ROM and executed by a processor such as Field programmable gate array (FPGA), digital signal processor (DSP), and central processing unit (CPU), and a program that is stored in the code ROM and executed by a general circuit such as CPU for personal computer (PC).

(Identification of Particular Pattern by Identification Execution Section 203)

The identification execution section 203 may be a dedicated circuit such as ASIC mounted in the camera, a program executed by a processor such as FPGA, DSP, CPU, or a program executed by a general circuit connected to an imaging section such as the camera, and may be any other suitable sections.

Omission of Constituents in Embodiment 1

Because the face detection technique is described in this embodiment, the recognition control parameter calculation sections are provided. However, in the case where the recognition control parameter cannot be found in additional learning, or additional learning is unnecessary, the learning control section 207 as well as the recognition control parameter calculation sections 121 and 122 may be omitted. The reason is as follows: Although the function identification parameter calculation section is configured as an on-line learning device in Embodiment 1, in the case where a person can view the image and change the identification parameter as appropriate, the learning device can be omitted. The identification parameter can be calculated as needed.

(Target of Image Recognition)

Although a person face is recognized in each embodiment, this embodiment is not limited to this. Figures of persons and animals, cars, trains, and so on may be recognized.

(Introduction of Majority Processing)

When a plurality of recognition control parameters are associated with the same imaging environment in the parameter table, a plurality of detectors indicated by the plurality of recognition control parameter may be simultaneously started to execute majority processing.

(Application to Personal Identification)

Figure 23:
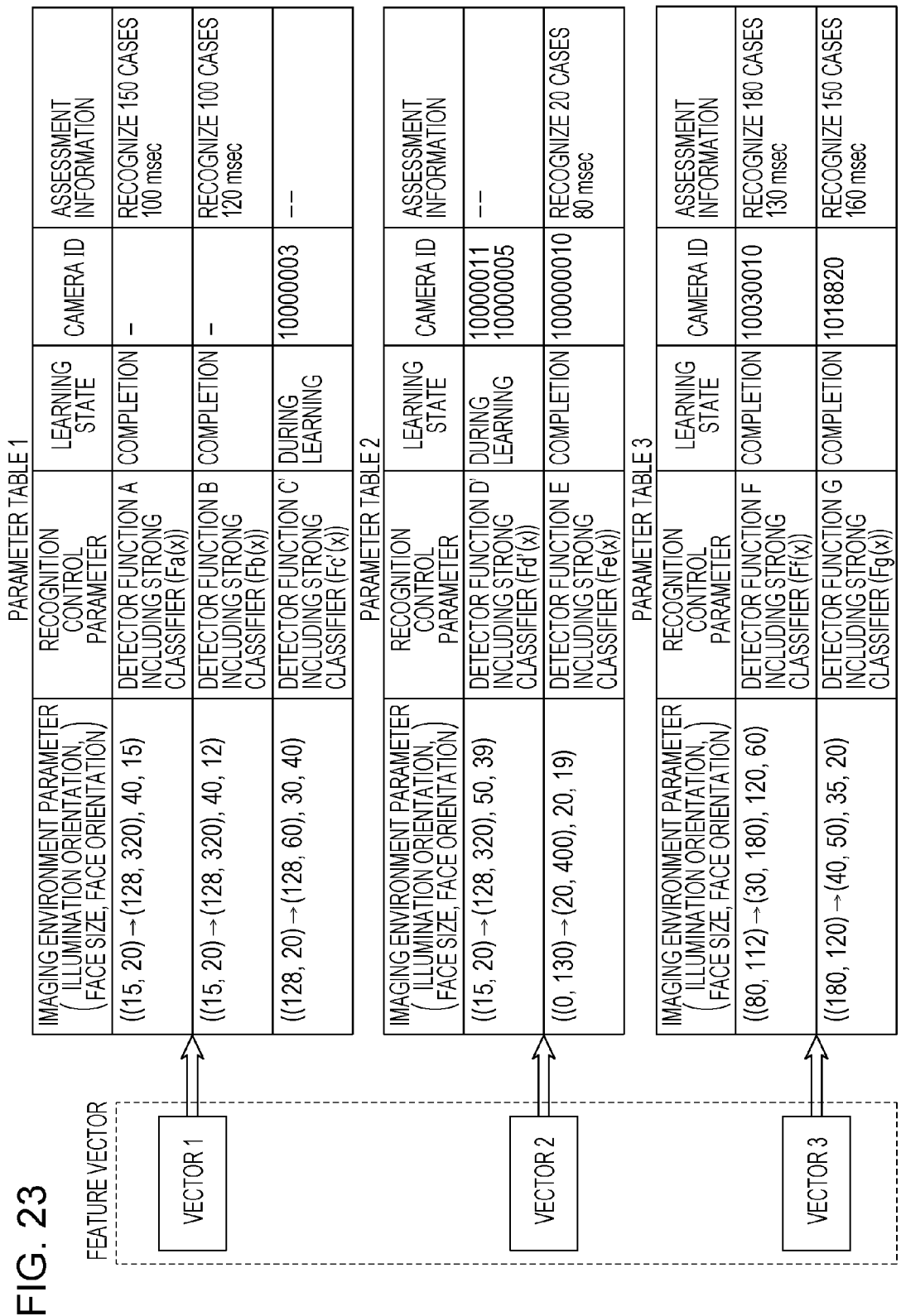
FIG. 23 illustrates a plurality of parameter tables associated with personal feature vectors.

The parameter table may be created for each person, and the parameter tables may be associated with feature vectors indicating personal features. FIG. 23 illustrates an example of the plurality of parameter tables associated with individual feature vectors. In this figure, three parameter tables 1, 2, and 3 are associated with three respective feature vectors (vectors 1, 2, and 3). The parameter manager 140 manages the parameter tables in this manner. When an image is taken, the particular-pattern recognition devices 111 to 114 extract a feature vector of the taken image, and transmits the extracted feature vector along with the imaging environment parameter at taking to the parameter manager 140. The parameter manager 140 receives the transmitted feature vector and imaging environment parameter, and searches for the recognition control parameter corresponding to the imaging environment parameter at taking across the parameter table associated with the feature vector. When the matched recognition control parameter is present, the parameter manager 140 returns the recognition control parameter to the particular-pattern recognition devices 111 to 114.

Figure 24:
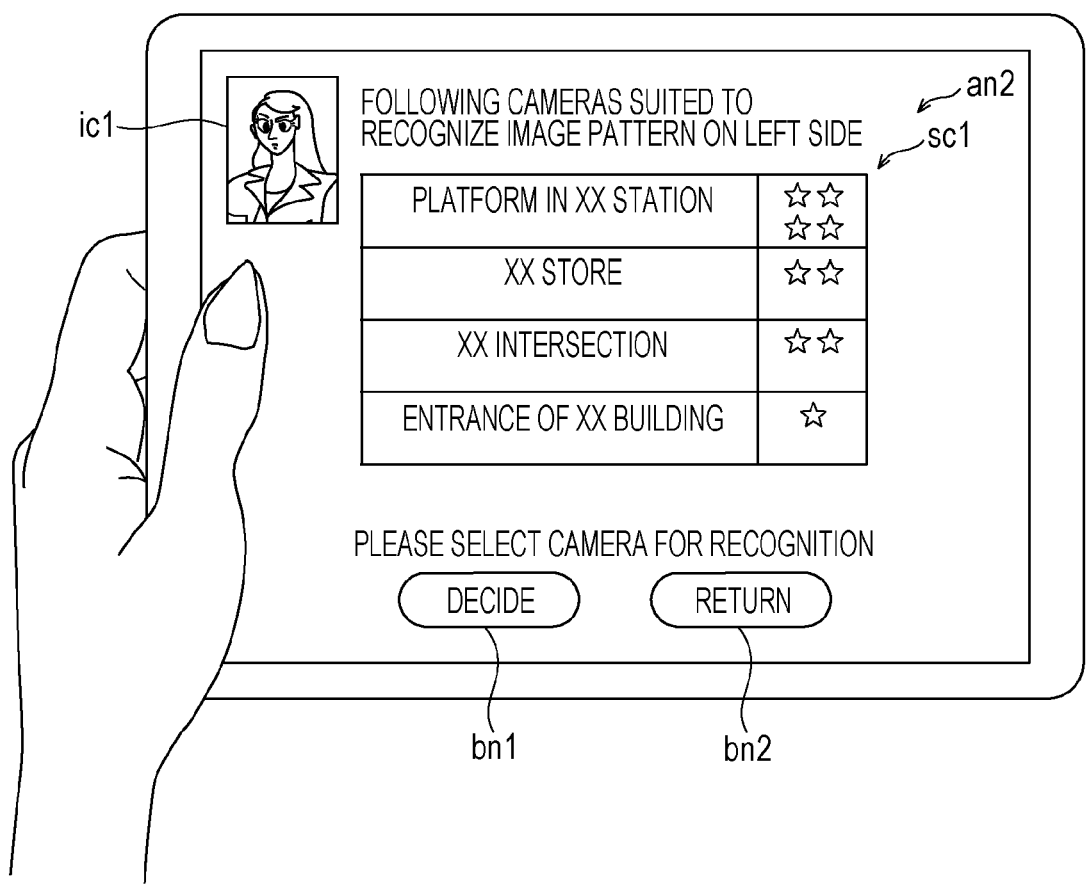
FIG. 24 illustrates an example of a dialogue screen for preventing imaging environment acquired by searching the parameter tables in FIG. 23.

FIG. 24 illustrates an example of a dialogue screen for presenting the imaging environment acquired by search of the parameter tables in FIG. 23 to the user. The dialogue screen displays a person image ic1 that is a basis for the feature vector associated with the parameter table. The imaging environment parameters displayed in a search result list correspond to recognition control parameters having the identical or similar detectors with respect to the feature vector of the person image.

Because a plurality of imaging environments associated with the person image are presented, the user can properly determine the imaging environment corresponding to the recognition control parameter on which the user should rely to recognize the person image display one on the dialogue screen. By associating the parameter tables with the feature vectors as described above, the camera system of the present disclosure can be applied to personal identification.

(Coding of Recognition Control Parameter)

Figure 25:
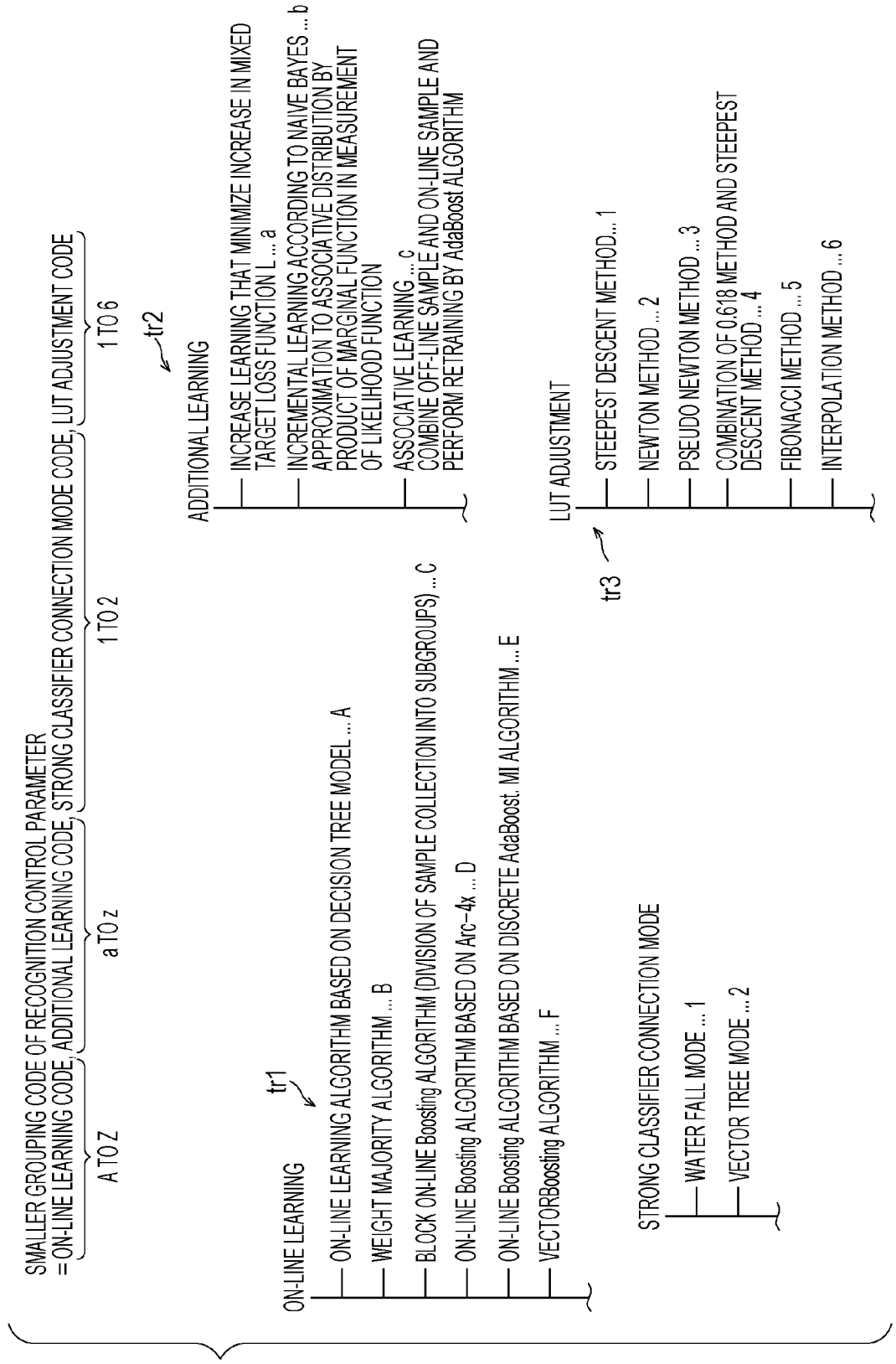
FIG. 25 is a view illustrating smaller grouping of the recognition control parameter.

The recognition control parameter may be coded to apply a smaller grouping to the recognition control parameter. The smaller grouping is configured of a plurality of codes divided by periods. FIG. 25 illustrates smaller grouping of the recognition control parameter described in a plurality of code systems. The plurality of code systems correspond to an on-line learning code, an additional learning code, a weak classifier connection mode code, and a lookup table adjustment code. Using the five codes, the detector is classified in terms of how off-line learning is performed, what additional learning is performed, how the weak classifier connection mode is, and how the lookup table is adjusted, in pattern identification of the image taken by the camera device. A tree structure tr1 indicates that learning methods using five algorithm are present in a type classified as on-line learning, and a code is assigned to each learning method.

(Target Scope of Feature Amount)

Larger grouping codes indicating the classification of the feature amount may be assigned to the recognition control parameter. Specifically, the classification codes indicate whether the feature amount targeted for image recognition is a first-generation feature amount captured from the entire image, a second-generation feature amount captured from a local area of the first-generation image, or a third-generation feature amount captured based on combination/correspondence of the feature amounts.

The second-generation feature amount is further classified as follows. Haar-like feature amount indicates whether a bright and dark pattern is present horizontally or vertically in the local area of the taken image. Specifically, Haar-like feature amount is given as a difference H(r1,r2) between average luminance S(r1) in a high-luminance area and average luminance S(r2) in a low-luminance area.

histogram oriented of gradient (HOG) feature amount is calculated from a plurality of gradients of 0 to 180 degrees with respect to the horizontal axis, and a histogram associating the gradients with frequencies in each local area. Edglet feature amount is extracted from an edge image acquired from an input image, and is compared with templates such as straight line, arc, and symmetry.

(Target Scope of Learning Algorithm of Additional Learning)

Wider learning algorithms can be used by assigning larger grouping codes indicating classification of learning algorithm to the recognition control parameter. Specifically, the classification codes indicates whether the learning algorithm on which image recognition is based is SVM, AdaBoost, RealAdaBoost, neural network, Deep-learning neural network, or Deformable Part Model. SVM determines an identification boundary at which a sample distance (margin) between two classes in the feature space. Learning by SVM is performed by calculating a weight assigned to the feature vector.

RealAdaBoost is an algorithm that makes an output of the weak classifier constant in distribution of feature amounts. Deep-learning neural network has more intermediate layers than a normal neural network to extract the feature amount effective for recognition at learning.

Deformable Part Model takes scoring base on a route filter Fo$\phi$(P0) capturing the entire person, Ft·$\phi$(Pt) capturing a local part, and a part filter positional relationship function di·$\phi$d(dxi,dyi).

(Variation of Learning Algorithm)

The learning algorithm of additional learning may be a weighting algorithm of assigning weight to the output of the weak classifier. AdaBoost assigns weights to outputs of a plurality of weak classifiers, and takes the total sum to detect face/non-face. Pre-processing of preparing N learning samples Xt . . . XN and label {+1, −1} corresponding to classes, a weight Di of the leaning sample is initialized, M weak classifier candidates are selected, and the error rate is calculated learning times T.

Multiple rounds are repeated as follows. A weak classifier h having the smallest error rate et is adopted as the weak classifier ht of the round t, and a weight $\alpha t$ assigned to the adopted weak classifier t is calculated according to $\alpha t = \frac{1}{2}(1 - et/et)$. Then, one having the smallest error rate is selected from the weak classifier candidates, the weight corresponding to the weak classifier is calculated, the weight Di(t) of the learning sample is updated, and Dt(i) is normalized. According to the algorithm, when the normalization of the weight Di(t) is completed, the learning state is determined to completion, and when the normalization is not completed, the learning state is determined to during learning.

(Specific Mode of State Where Leaning Outcome is Present)

"The state where the recognition control parameter has a leaning outcome" may be suitably selected according to the system operation. In Embodiment 1, the state where additional learning of the strong classifier is concluded (the partial differential value g of the target loss function L(p(x, y),c+$\Delta$c) become an extreme small value) is defined as "the state where the leaning outcome is present". However, according to the present disclosure, the state where the convergence rate or degree of achievement of additional learning exceeds a predetermined threshold may be defined as the state where additional learning of the strong classifier is concluded. Alternatively, the state where the occurrence of wrong recognition falls below a threshold may be defined as "the state where a leaning outcome is present".

(System of Technical Concepts)

This disclosure includes various aspects of an image recognition method and a camera device that can solve the above-mentioned problems. The plurality of aspects constitute a system of following 1., 2., 3. . . . . technical concepts.

1. is a basis for the system of technical concepts, that is, an image recognition method for a camera system including a plurality of camera devices, the method including:

acquiring imaging environment information indicating an imaging environment at a time of taking an image by one camera device;

selecting a recognition control parameter suitable for the imaging environment indicated by the imaging environment information; and recognizing the taken image by using the selected recognition control parameter, wherein the camera system manages each of a plurality of selectable recognition control parameter in association with the imaging environment targeted for image recognition, and in selecting the recognition control parameter, the recognition control parameter that is used to recognize the images previously taken by any of the plurality of camera devices in the camera system, and has a leaning outcome in the imaging environment that is identical or similar to the imaging environment indicated by the acquired imaging environment information is searched.

According to this aspect, the recognition control parameter most suited for environmental conditions of the site where the camera device is installed can be selected and used, thereby suppressing the effect of a difference between actual conditions and assumed to recognize a particular pattern. This can improve identification performance without manually adjusting the installation environment of each camera device, and calculating the recognition control parameter by machine learning at all times.

2. Contents of image recognition can be further subordinate-conceptualized. Subordinate conceptualization is that the taken image is recognized by applying the selected recognition control parameter to a pattern acquired through analysis of the taken image or a sample collection in the feature space to be compared with the pattern to determine whether or not the pattern matching the sample collection is present in the taken image. Even when the recognition control parameter is a boundary function partitioning the recognition space or a transition function of transitioning an existing sample on the recognition space, the previous leaning outcome can be used, increasing its utility.

3. Optionally, processing executed when the imaging environment changes can be added. From this aspect, when the imaging environment changes, the recognition control parameter corresponding to the changed imaging environment is searched, and when the recognition control parameter corresponding to the changed imaging environment is present, the recognition control parameter is used to identify a pattern in the taken image.

The imaging environment can be selected according to a change of the illumination state in each time frame such as morning, daytime, and evening, preventing the problem that the recognition control parameter selected once according to the imaging environment becomes useless with time.

4. Optionally, the imaging environment can be associated with the recognition control parameter. In this aspect, the camera system has a table including a plurality of entries, the entries in the table represent imaging environment information in association with the recognition control parameter, recognizing the taken image includes new learning of a pattern in the taken image, new learning is performed by calculating the recognition control parameter corresponding to the taken image targeted for learning, and adding an entry representing the imaging environment information indicating the imaging environment of the camera device that takes an image targeted for learning, in association with the recognition control parameter, to the table. Because the table explicitly shows the correspondence between the recognition control parameter and the imaging environment, by describing the table using a syntax of relational database, the present disclosure can be implemented.

5. Optionally, processing at new learning can be added. From this aspect, a change of the imaging environment of the camera device that takes an image is monitored, when the imaging environment changes, the recognition control parameter corresponding to the changed imaging environment is searched, when the recognition control parameter corresponding to the changed imaging environment is not present, new learning is performed. The new learning is performed when the imaging environment changes, and the recognition control parameter corresponding to the changed imaging environment is not present, minimizing a processing delay caused by start of new learning.

6. Optionally, camera setting can be added. From this aspect, when the recognition control parameter corresponding to the imaging environment that is similar to the imaging environment in which the camera device is installed has a leaning outcome in the imaging environment, it is determined whether or not the camera setting can be converted into the similar imaging environment, when the camera setting can be converted, the camera device takes an image at the converted setting, when the camera setting cannot be converted, the recognition control parameter suited for the similar imaging environment is calculated. The camera setting can be converted to be close to the imaging environment having the leaning outcome, optimizing the system including the individual cameras to improve the recognition performance of the whole system.

7. Optionally, a threshold for selecting the recognition control parameter can be added. From this aspect, in searching the recognition control parameter, calculating similarity between the imaging environment in which one camera device that takes an image is placed, and the imaging environment indicated by the imaging environment information, and comparing the similarity with a predetermined threshold, when one or more recognition control parameters having similarity exceeding the threshold is present, using the recognition control parameter having the highest similarity for pattern identification of the taken image, when the recognition control parameter having similarity exceeding the threshold is not present, the recognition control parameter having the highest similarity among the recognition control parameters having the similarity less than the threshold is used as a basis for calculating a new recognition control parameter. When similarity is less than the threshold, the recognition control parameter corresponding to the imaging environment information having the highest similarity among the imaging environments is used as a basis for calculating a new recognition control parameter, minimizing time taken to conclude training on the new recognition control parameter.

8. Optionally, processing of a sample collection can be added. From this aspect, the camera system has a table including a plurality of entries, the entries in the table represents information indicating the imaging environment in association with the recognition control parameter and the learning state of the recognition control parameter, the learning state includes a state where learning of the recognition control parameter is completed, and a state where learning is not completed, and additional learning of the recognition control parameter having the uncompleted learning state is performed, and the additional learning of the recognition control parameter having the uncompleted learning state includes processing of extracting elements to be added to the sample collection from the taken image acquired by a plurality of camera devices placed in the same imaging environment as the corresponding imaging environment. When the learning state of the recognition control parameter corresponding to the imaging environment having the highest similarity is uncompleted learning, the sample to be supplied to the recognition control parameter during learning is increased with the camera placed in the same imaging environment, enabling acquisition of the recognition control parameter capable of addressing various patterns.

9. Optionally, ran environment classification function can be added to selection of the recognition control parameter. From this aspect, the image recognition method calculates two or more imaging environment classification functions, and the imaging environment classification function serves to classify the imaging environment information associated with the imaging environment into two or more subgroups in the imaging environment recognition space, and when a taken image is acquired by a camera device, the recognition control parameter corresponding to the similar imaging environment is acquired by mapping the imaging environment information indicating the imaging environment at taking of the image to the imaging environment recognition space, and determining the subgroup to which a mapping point belongs using the imaging environment classification function. When a taken image can be acquired from a camera by grouping the imaging environment using the recognition control parameter, the recognition control parameter having a leaning outcome in the imaging environment that is closest to the imaging environment of the newly taken image can be rapidly searched.

10. In implementing the camera device, the camera device is a camera device used in a camera system, the camera system includes:

when an image is taken, an acquisition section that acquires imaging environment information indicating an imaging environment;

search section that searches the recognition control parameter that is used to recognize images previously taken by other camera devices in the camera system, and has a leaning outcome in the imaging environment that is identical or similar to the imaging environment indicated by the acquired imaging environment information;

when the recognition control parameter having the leaning outcome in the similar imaging environment is present, a enable/disable determination section that determines whether or not camera setting can be changed to the similar imaging environment; and when the setting of the camera device can be changed, a change section that changes the camera setting is changed to the similar imaging environment. The camera setting is changed to be close to the imaging environment having a leaning outcome, optimizing the particular pattern recognition system including individual cameras to improve recognition performance of the whole system.

Also in implementing the camera device from the aspect 10, modifications such as 2 to 9 in the image recognition method can be made.

In a camera system using a plurality of camera devices with different imaging environments, the recognition control parameter sharing system of the present disclosure has a function of acquiring a recognition control parameter suitable for the environment, and is effective in identifying a particular pattern in a varying natural imaging environment. Further, the system can be applied to a camera having a function of adding a new function after installment, and is effective in adding and performing a function to identify a particular pattern in a function-added mobile terminal.

What is claimed is:

1. A method for image recognition using a camera system, the camera system including a plurality of camera devices, the method comprising:

acquiring, by a communication interface and from a first camera device of the plurality of camera devices, a first image and first imaging environment information, wherein the first image is taken by the first camera device, and the first imaging environment information indicates a first imaging environment of the first camera device at a time of taking the first image;

determining, by a processor using a parameter table that stores previous imaging environment information indicating imaging environments of previous images taken at previous times by the plurality of camera devices and recognition control parameters corresponding to the imaging environments, a first recognition control parameter based on the first imaging environment information, wherein the first recognition control parameter indicates a first detector corresponding to a second imaging environment of a second image taken by a second camera device of the plurality of camera devices, the second imaging environment having a similarity that is identical or of a degree that exceeds a predetermined threshold with respect to the first imaging environment; and performing, by the processor, image recognition of the first image acquired from the first camera device, using the first detector indicated by the first recognition control parameter, wherein the previous imaging environment information indicating the imaging environments of the previous images taken at the previous times by the plurality of camera devices includes information on any of surrounding illuminance of the previous images, illumination orientation of the plurality of camera devices, distortion due to lenses attached to the plurality of camera devices, shake of the previous images due to shake of the plurality of camera devices, target object size in the previous images, and target object orientation in the previous images.

2. The method according to claim 1, wherein the image recognition of the first image is performed by applying the first detector to pattern information indicating a feature vector of the first image that is extracted from the first image.

3. The method according to claim 1, further comprising:

acquiring, from the first camera device, a third image and third imaging environment information, wherein the third image is taken by the first camera device, and the third imaging environment information indicates a third imaging environment of the first camera device at a time of taking the third image;

when the first imaging environment information is different from the third imaging environment information, determining, by using the parameter table, a second recognition control parameter, wherein the second recognition indicates a second detector corresponding to a fourth imaging environment, the fourth imaging environment having a similarity that is identical or of a degree that exceeds the predetermined threshold with respect to the third imaging environment; and performing image recognition of the third image acquired from the first camera device, using the second detector indicated by the second recognition control parameter.

4. The method according to claim 3, further comprising:
when the first camera device takes the third image in the third imaging environment that is different from the first imaging environment, acquiring, from the first camera device, the third image and the third imaging environment information;
searching the parameter table for the second recognition control parameter;
when the second recognition control parameter is not present in the parameter table, generating the second recognition control parameter according to a predetermined learning algorithm; and
updating the parameter table using the generated second recognition control parameter.

5. The method according to claim 1, further comprising:
when the first recognition control parameter is not present in the parameter table, generating the first recognition control parameter according to a predetermined learning algorithm; and
updating the parameter table by using the generated first recognition control parameter.

6. The method according to claim 5, wherein
when the first recognition control parameter is generated according to the predetermined learning algorithm,
the first image and a feature vector extracted from a third image are used as a base, wherein the third image is taken by one of the plurality of camera devices that is different from the first camera device in the first imaging environment indicated by the first imaging environment information.

7. The method according to claim 1, further comprising:
when the first recognition control parameter indicates the first detector corresponding to the second imaging environment that has the similarity that is not identical with respect to the first imaging environment, transmitting, to the first camera device, an instruction to change a setting of the first camera device to take an image in the second imaging environment;
acquiring a third image taken in the second imaging environment from the first camera device; and
performing image recognition of the third image acquired from the first camera device, using the first detector indicated by the first recognition control parameter.

8. The method according to claim 1, further comprising:
calculating similarity degrees between the first imaging environment information indicating the first imaging environment and the previous imaging environment information indicating each of the imaging environments in the parameter table; and
when the parameter table includes a plurality of pieces of previous imaging environment information that indicates the imaging environments having the similarity of the degree exceeding the predetermined threshold with respect to the first imaging environment, determining the first recognition control parameter indicating the first detector based on one of the imaging environments having a highest similarity degree.

9. The method according to claim 1, further comprising:
calculating similarity degrees between the first imaging environment information indicating the first imaging environment at the time of taking the first image and the previous imaging environment information indicating each of the imaging environments in the parameter table; and
when the parameter table does not include the previous imaging environment information that indicates one of the imaging environments having the similarity of the degree exceeding the predetermined threshold with respect to the first imaging environment:
determining a second recognition control parameter, wherein the second recognition control parameter indicates one detector corresponding to one of the imaging environments having a highest similarity degree from the similarity degrees that are smaller than the predetermined threshold; and
generating a third recognition control parameter used for recognition of a newly acquired image based on the third recognition control parameter according to a predetermined learning algorithm.

10. The method according to claim 1, further comprising:
classifying the previous imaging environment information indicating each of the imaging environments based on one of each feature vector of each of the previous images taken by the plurality of the camera devices or information indicating each of the imaging environments detected at each of the previous times of taking the previous images by the plurality of the camera devices;
associating recognition control parameters indicating detectors with the classified previous imaging environment information; and
managing the recognition control parameters in the parameter table.

11. A camera system provided with a plurality of camera devices, the camera system comprising:
a communication interface that, when a first image is taken by a first camera device of the plurality of camera devices, acquires the first image and first imaging environment information, the first imaging environment indicating a first imaging environment of the first camera device at a time of taking the first image;
a processor; and
a memory including instructions that, when executed by the processor, cause the processor to perform operations including:
determining, using a parameter table that stores previous imaging environment information indicating imaging environments of previous images taken at previous times by the plurality of camera devices and recognition control parameters corresponding to the imaging environments, a first recognition control parameter based on the first imaging environment information, wherein the first recognition control parameter indicates a first detector corresponding to a second imaging environment of a second image taken by a second camera device of the plurality of camera devices, the second imaging environment having a similarity that is identical or of a degree that exceeds a predetermined threshold with respect to the first imaging environment; and
performing image recognition of the first image acquired from the first camera device, using the first detector indicated by the first recognition control parameter,
wherein the previous imaging environment information indicating the imaging environments of the previous images taken at the previous times by the plurality of camera devices includes information on any of surrounding illuminance of the previous images, illumination orientation of the plurality of camera devices, distortion due to lenses attached to the plurality of camera devices, shake of the previous images due to shake of the plurality of camera devices, target object size in the previous images, and target object orientation in the previous images.

* * * * *